United States Patent
Allison et al.

(10) Patent No.: US 11,597,290 B2
(45) Date of Patent: Mar. 7, 2023

(54) FLOW BATTERY-BASED CHARGING SYSTEMS

(71) Applicant: LARGO CLEAN ENERGY CORP., Andover, MA (US)

(72) Inventors: Chad Jeromy Allison, Stow, MA (US); Michael Falcinelli, Boxford, MA (US); Peter Gottlieb, Wayland, MA (US); Gregory A. Morehead, Kittery, ME (US)

(73) Assignee: LARGO CLEAN ENERGY CORP., Andover, MA (US)

( * ) Notice: Subject to any disclaimer, the term of this patent is extended or adjusted under 35 U.S.C. 154(b) by 0 days.

(21) Appl. No.: 17/525,159

(22) Filed: Nov. 12, 2021

(65) Prior Publication Data

US 2022/0072971 A1 Mar. 10, 2022

Related U.S. Application Data

(62) Division of application No. 16/388,850, filed on Apr. 18, 2019, now abandoned.

(60) Provisional application No. 62/720,511, filed on Aug. 21, 2018, provisional application No. 62/659,318, filed on Apr. 18, 2018.

(51) Int. Cl.
*B60L 53/53* (2019.01)
*H01M 8/18* (2006.01)
*H01M 8/04858* (2016.01)
*B60L 55/00* (2019.01)

(52) U.S. Cl.
CPC ............ *B60L 53/53* (2019.02); *B60L 55/00* (2019.02); *H01M 8/0491* (2013.01); *H01M 8/188* (2013.01); *B60L 2210/10* (2013.01); *B60L 2210/30* (2013.01); *H01M 2250/20* (2013.01)

(58) Field of Classification Search
CPC ...... B60L 53/53; B60L 55/00; B60L 2210/10; B60L 2210/30; H01M 8/0491; H01M 8/188; H01M 2250/20; Y02E 60/00; Y02E 60/50; Y02T 10/70; Y02T 10/7072; Y02T 10/72; Y02T 90/12; Y02T 90/14; Y02T 90/16; Y02T 90/40; Y04S 10/126
USPC ......................................................... 320/109
See application file for complete search history.

(56) References Cited

U.S. PATENT DOCUMENTS

| | | | |
|---|---|---|---|
| 2013/0011704 A1 | 1/2013 | Horne et al. | |
| 2013/0257150 A1* | 10/2013 | Kawasaki | B60L 53/14 307/10.1 |
| 2019/0143822 A1* | 5/2019 | Malek | B60L 53/20 320/109 |

* cited by examiner

*Primary Examiner* — Paul Dinh
(74) *Attorney, Agent, or Firm* — Cantor Colburn LLP

(57) ABSTRACT

A flow battery system can include at least one pair of electrolyte storage, a first battery stack, and a second battery stack. The electrolyte storage pair can include an anolyte storage configured to contain an anolyte solution, and a catholyte storage configured to contain a catholyte solution. The first battery stack can be fluid communication with the electrolyte storage pair. The first battery stack can also be configured to receive electrical energy from a power source and to facilitate redox reactions storing the received electrical power as chemical energy by the anolyte and catholyte solutions. The second battery stack can be in fluid communication with the at least one pair of electrolyte storage. The second battery stack can also be configured to supply electrical energy to an electrical load, and to facilitate redox reactions releasing chemical energy stored by the anolyte and catholyte solutions as electrical energy to the load.

13 Claims, 18 Drawing Sheets

FLOW BATTERY-BASED CHARGING SYSTEMS

CROSS-REFERENCE TO RELATED APPLICATIONS

This application is a divisional of U.S. patent application Ser. No. 16/388,850, filed on Apr. 18, 2019, both applications claiming the benefit of U.S. Provisional Application No. 62/659,318, filed Apr. 18, 2019, entitled "Flow Battery System" and U.S. Provisional Application No. 62/720,511, filed Aug. 21, 2018, entitled "Flow Battery System." The entirety of each of these applications is incorporated by reference.

BACKGROUND

Sales of plug-in electric vehicles (PEVs), including battery electric vehicles and plug-in hybrid electric vehicles, has experienced significant growth in the US and abroad. As an example, the US electric vehicle market experienced 32% annual growth between 2012-2015 and continues to increase. For context, if a growth rate of 40% is achieved between 2017-2023, electric vehicles would constitute approximately 10% of all US vehicle sales in 2023.

However, growing PEV use presents challenges to existing vehicle charging infrastructure. In contrast to liquid refueling stations, plug-in charging stations draw power from electrical grids to recharge the electrical batteries of PEVs. In order to provide charging times comparable to consumer expectations based upon refueling gasoline/diesel vehicles (e.g., about 5 minutes), charging stations should possess very high power output. As an example, in order to charge a PEV battery of 100 kWh in 5 minutes, the power delivered by the charger should be about 1200 kWh. Assuming 60,000 PEVs charge at the same time, a number that is roughly 0.25% of all registered vehicles in Texas, 72 GWh of power would be consumed, approximately the peak demand of the entire Texas electrical grid. Thus, power delivery requirements necessary to support mass electric vehicle usage is expected to dwarf that which can be provided by electrical grids.

Accordingly, improved approaches for supplying power to electric vehicle charging stations are needed.

SUMMARY

In an embodiment, a charging system is provided. The charging system can include a flow battery and one or more charging ports. The flow battery can include at least one pair of electrolyte storage, and at least one battery stack. The at least one pair of electrolyte storage can include an anolyte storage configured to contain an anolyte solution and a catholyte storage configured to contain a catholyte solution. The at least one battery stack can be in fluid communication with the at least one pair of electrolyte storage. The at least one battery stack can be configured to receive electrical energy from a power source and to facilitate redox reactions storing the received electrical power as chemical energy by the anolyte and catholyte solutions. The at least one battery stack can be further configured to supply electrical energy to an electrical load, and to facilitate redox reactions releasing chemical energy stored by the anolyte and catholyte solutions as electrical energy to the electrical load. The one or more charging ports can be configured for electrical communication with an electric vehicle (EV). The power source can be an electrical grid. The load can include at least one of the EV or the electrical grid.

In one embodiment, the system is further configured to receive electrical power from at least one other power source different from the electrical grid. The other power source can be selected from renewable energy sources and electrical generators.

In one embodiment, the at least one battery stack includes a single battery stack.

In one embodiment, the at least one battery stack includes a first battery stack and a second battery stack. The first battery stack can be in fluid communication with the at least one pair of electrolyte storage, and the first battery stack can be configured to receive electrical energy from a power source and to facilitate redox reactions storing the received electrical power as chemical energy by the anolyte and catholyte solutions. The second battery stack can be in fluid communication with the at least one pair of electrolyte storage and the second battery stack can be configured to supply electrical energy to the electrical load, and to facilitate redox reactions releasing chemical energy stored by the anolyte and catholyte solutions as electrical energy to the electrical load.

In an exemplary embodiment, a charging system is provided. The charging system can include one or more vehicle charging ports, an input port, and an energy storage system (ESS). The input port can be configured to receive power input from an electrical grid. The ESS can be configured to electrically couple to both the electrical grid and the vehicle charging ports. The ESS can also be configured to supply electrical power to an electric vehicle (EV) in electrical communication with one of the vehicle charging ports. The ESS can be further configured to supply electrical power to the electrical grid. The ESS can be additionally configured to receive electrical power from the electrical grid.

In one embodiment, the ESS includes a flow battery. The flow battery can include an anolyte storage vessel, a catholyte storage vessel, and an electric vehicle (EV) power block. The anolyte storage vessel can be configured to receive a negatively charged electrolyte. The catholyte storage vessel can be configured to receive a positively charged electrolyte. The EV power block can be configured to receive an AC input. The EV power block can include one or more battery stacks and a multi-port, multi-directional AC/DC inverter. The one or more battery stacks can be configured to store electrical energy by converting a received current into chemical energy to form a charged electrolyte and to release electrical energy in the form of a first DC at a first voltage by converting stored chemical energy from the charged electrolyte into electrical energy. The multi-port, multi-directional AC/DC inverter can be configured for electrical connection to the AC input, the one or more battery stacks, and the one or more vehicle charging ports and to convert AC received from the AC input into a second DC at a second voltage.

In one embodiment, the EV power block can further include a DC bus in electrical communication with the AC/DC inverter, the one or more battery stacks, and the one or more vehicle charging ports. The DC bus can be configured to select a charging source from at least one of the AC/DC inverter and the one or more battery stacks, receive DC from the selected charging source(s), and direct the received DC to the one or more vehicle charging ports.

In one embodiment, the EV power block can further include a DC/DC converter in electrical communication with the DC bus. The DC/DC converter can be configured to receive a third DC at a third voltage from a DC input and convert the third DC to a fourth DC at a fourth voltage. The DC bus can be configured to select a vehicle charging source from at least one of the AC/DC inverter, the one or more battery stacks, and the DC/DC converter, receive DC from the selected charging source(s), and direct the received DC to the one or more vehicle charging ports.

In one embodiment, the DC bus can be configured to direct at least one of the first and third DC to the one or more battery stacks for charging the one or more battery stacks.

In one embodiment, the system can further include a plurality of EV power blocks in fluid communication with a plurality of pairs of anolyte and catholyte storage vessels. The plurality of EV power blocks can be configured to switch between receipt of charged electrolyte from a first pair of anolyte and catholyte storage vessels and a second pair of anolyte and catholyte storage vessels.

In an embodiment, a charging system is provided. The charging system can include at least one flow battery, a first DC/DC converter, an AC/DC inverter, a second DC/DC converter, a single DC bus, a site controller, and one or more charging ports. The at least one flow battery can be configured to output a first DC at a first voltage. The first DC/DC converter can be configured to receive the first DC and to output a second DC at a second voltage. The AC/DC inverter can be configured to receive AC from an AC power source and to output a third DC at a third voltage. The second DC/DC converter can be configured to receive a fourth DC at a fourth voltage and output a fifth DC at a fifth voltage. The single DC bus can be configured to receive the second DC and the third DC and output the fourth DC. The site controller can be in signal communication with the first DC/DC converter, the AC/DC inverter, and the second DC/DC converter. The site controller can be configured to transmit commands to at least one of the first DC/DC converter and the AC/DC inverter to adjust the second voltage and the third voltage. The one or more charging ports can be configured to receive the fifth voltage and transmit the fifth voltage to an electric vehicle (EV).

In one embodiment, the AC power source is an electrical grid.

In one embodiment, the site controller can be configured to adjust the second voltage and the third voltage to achieve a voltage on the common DC bus within a predetermined range.

In one embodiment, the site controller can be configured to command the first DC/DC converter to receive a sixth DC at a sixth voltage from the common DC bus and to output a seventh DC at a seventh voltage to the at least one flow battery for charging the at least one flow battery.

In one embodiment, the site controller can be configured to command the DC/DC converter to output the second DC to the common DC bus and to command the AC/DC inverter to output the third DC to the common DC bus to achieve a predetermined bus voltage on the common DC bus relative to an open circuit voltage of the at least one flow battery to selectively charge or discharge the at least one flow battery.

In one embodiment, the at least one flow battery can include a plurality of battery stacks and a plurality of first DC/DC converters. The plurality of battery stacks can be arranged electrically in parallel and each of the plurality of battery stacks can be configured to output the first DC. The plurality of first DC/DC converters can be arranged electrically in series and each DC/DC converter can be configured to receive the first DC from a respective one of the plurality of battery stacks.

In one embodiment, the common DC bus is configured to receive an eighth DC directly from a variable DC power source having a variable voltage output.

In one embodiment, the variable DC power source is not connected to the common DC bus via a DC/DC converter.

In one embodiment, the site controller can be configured to adjust the second voltage and the third voltage to regulate the voltage on the common DC bus within a predetermined range such that an impedance of the common DC bus matches an impedance of the variable DC power source.

In one embodiment, the at least one flow battery can include a plurality of battery stacks and a plurality of DC/DC converters. The plurality of battery stacks can be arranged electrically in parallel and of the plurality of battery stacks can be configured to output the first DC. The plurality of DC/DC converters can be galvanically isolated from one another and arranged electrically in series with one another. Each DC/DC converter can be configured to receive the first DC from a respective one of the plurality of battery stacks.

In one embodiment, the at least one flow battery can include a first flow battery and a second flow battery, a first DC/DC converter and a second DC/DC converter. Each of the first and second flow batteries can include at least one battery stack configured to output the first DC. The first DC/DC converter can be configured to receive the first DC from a battery stack of the first flow battery. The second DC/DC converter can be configured to receive the first DC from a battery stack of the second flow battery. The first and second DC/DC converters can be galvanically isolated from one another and arranged electrically in parallel with one another.

In one embodiment, the first flow battery can include a first plurality of battery stacks arranged electrically in parallel with one another and the second flow battery can include a second plurality of battery stacks arranged electrically in parallel with one another.

In one embodiment, the charging system can further include a first plurality of DC/DC converters including the first DC/DC converter and a second plurality of DC/DC converters including the second DC/DC converter. Each DC/DC converter of the first plurality of DC/DC converters can be arranged electrically in series and can be configured to receive the first DC from a respective battery stack of the first plurality of battery stacks. Each DC/DC converter of the second plurality of DC/DC converters can be arranged electrically in series and can be configured to receive the first DC from a respective battery stack of the second plurality of battery stacks.

BRIEF DESCRIPTION OF THE DRAWINGS

The present disclosure will be more fully understood from the following detailed description taken in conjunction with the accompanying drawings, in which.

Figure 1:
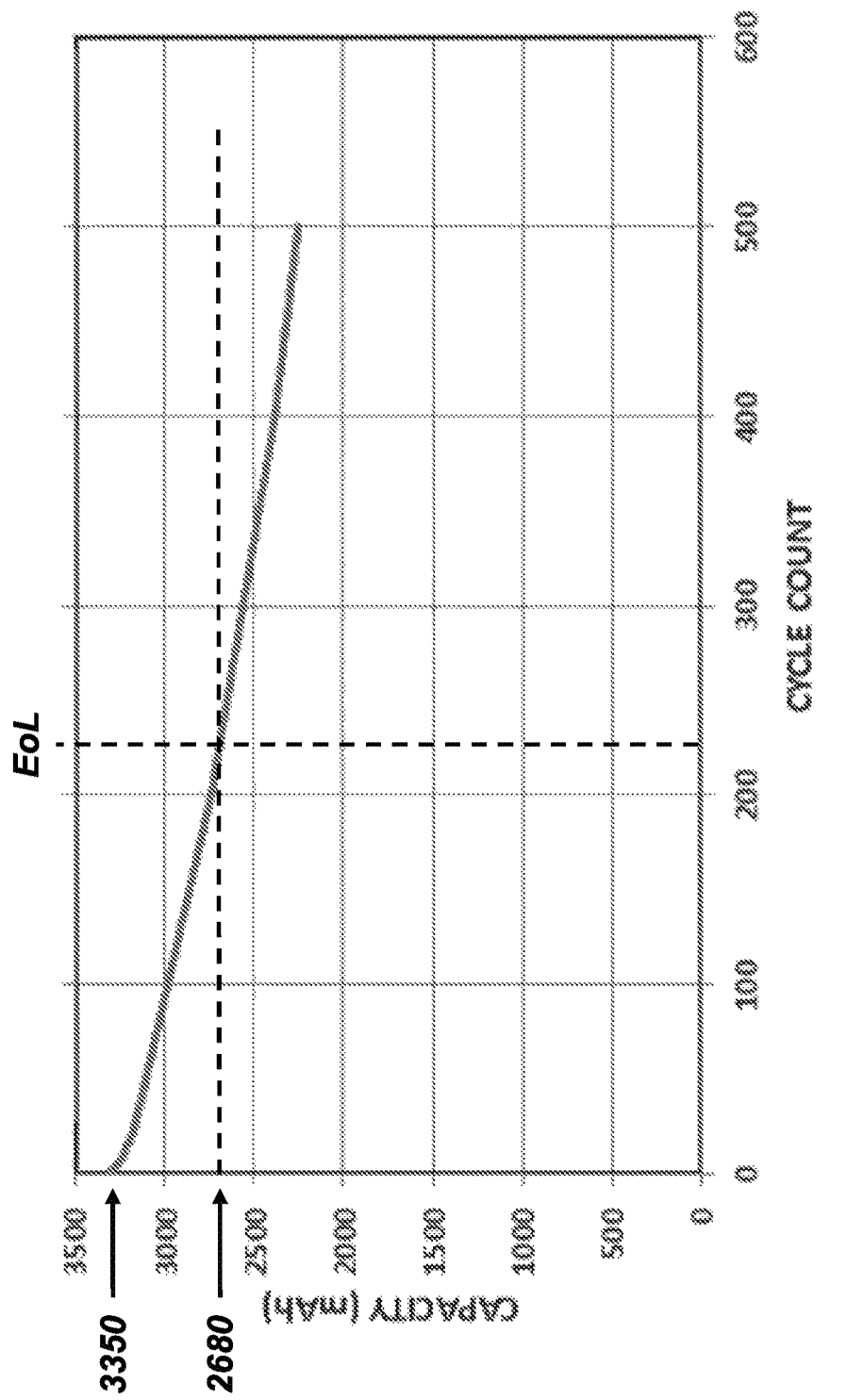
FIG. 1 is a plot illustrating capacity of an existing Li-ion battery as a function of cycle count.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments are described below to provide an overall understanding of the principles of the structure, function, manufacture, and use of the devices disclosed herein. One or more examples of these embodiments are illustrated in the accompanying drawings. Those skilled in the art will understand that the devices specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

A challenge faced with mass adoption of electric vehicles is the need for large numbers of charging stations, analogous to fueling stations for conventional gasoline and diesel powered vehicles. Existing charging stations draw power (energy per unit time) from the electrical grid to recharge electric vehicles. However, to facilitate rapid charging of electric vehicles, the power demand per vehicle is relatively large over a short time period. As the number of electric vehicles on the road increases, it is predicted that the electrical grid will be unable to meet this demand.

This problem is not one of available energy but capability to deliver power. That is, the electrical grid as currently constructed may possess sufficient generating capacity to supply the required amount of energy, but this energy cannot be delivered within the required time frame.

One approach to address this challenge is the use of large-scale energy storage systems. As an example, an energy storage system can be provided in communication with chargers of an electric vehicle charging station. The energy storage system can receive and store energy from an electrical power source (e.g., the electrical grid, renewable energy sources, etc.) and release the stored energy to an electric vehicle via a charger as needed. In one aspect, an energy storage system can discharge energy when the power demand of the charging station is greater than supply by the electrical grid alone. Alternatively, an energy storage system can operate independently of the electrical grid when access to the electrical grid is not available (e.g., in remote locations or under blackout conditions).

However, not every energy storage system is suitable for deployment at large-scale. Notably, factors such as cost, reliability, safety, performance, and regulation can each influence the suitability of an energy storage system for a particular application. In particular, conventional secondary (rechargeable) batteries, such as lead acid, nickel-cadmium (Ni—Cd), nickel-metal-hydride (NiMH), and lithium ion (Li-ion) exhibit cycle dependent performance that can render them unsuitable for use as large-scale energy storage for vehicle charging stations applications.

This cycle-dependent behavior can be observed with reference to FIG. 1, which illustrates the capacity of an exemplary Li-ion battery cell (Model NCR18650B, Panasonic) as a function of cycle count assuming charge at a maximum current of 0.5 C and discharge at a current of 1 C at 25° C. This battery cell has a typical rated capacity (C) of 3350 mAh at a nominal voltage of 3.6 V, indicating that when new (0 cycles) and fully charged it can output a current of 3350 mA for one hour. Multiple battery cells can be combined to form a battery cell stack.

As shown, the minimum capacity C decreases as the number of charge-discharge cycles increases. For example, minimum capacity C decreases to about 70% after 500 cycles. End of life (EoL) of the battery is defined as the number of charge-discharge cycles at which the battery should be replaced. For exemplary purposes, using 80% of the rated minimum capacity (2,680 mAh) as the criteria for EoL, it can be observed that the expected EoL of the battery cell is approximately 225 days, assuming one charge-discharge cycle a day. This result indicates that the battery cell can require replacement more than once per year, which can be extremely costly and environmentally hostile.

Various techniques can be used to increase EoL in conventional secondary batteries. In one aspect, the minimum capacity C can be increased, which shifts the entire capacity-cycle curve upwards. In another aspect, the maximum capacity to which the battery is charged can be reduced (e.g., from 100% to about 70%-90%) and/or the minimum capacity to which the battery is discharged can be increased (e.g., from 0% to about 10%-30%). In a further aspect, the rate at which the battery is discharged, referred to as C-rate, can be decreased. However, each of these approaches has drawbacks. Increasing capacity can result in a battery that is greatly oversized to provide extended cycle life, increasing the cost of the battery. Changing the maximum fraction of capacity to which the battery is charged or the minimum fraction of capacity to which the battery is discharged reduces the total charge capacity that is stored and can be supplied for a given charge-discharge cycle. Decreasing C-rate increases the time required to charge an electric vehicle to a given capacity.

Flow batteries, also known as redox flow batteries or redox flow cells, can be used for large-scale energy storage as an alternative to conventional secondary batteries. In general, flow batteries can use externally supplied, ion containing solutions (electrolytes) which include reactants that participate in reversible electrochemical reactions. During charging, electrical energy supplied to the electrolytes at electrodes can cause reduction (electron gain) in one electrolyte and oxidation (electron loss) in the other electrolyte, thus storing the supplied electrical energy as chemical energy. Upon discharge, these reactions can be performed in reverse to release the chemical energy stored by the electrolytes and electrical energy can be drawn from the electrodes.

In contrast to conventional secondary batteries, flow batteries avoid many of the drawbacks discussed above. In one aspect, flow batteries can avoid cycle dependent behavior because the reduction-oxidation (redox) reactions are completely reversible. Thus, flow batteries can be charged and discharged multiple times per day with no degradation. In another aspect, energy storage provided by flow batteries (e.g., by the volume of electrolytes) and power generation provided by flow batteries (e.g., by battery stacks) are independent from one another. Thus, additional capacity can be added by increasing the volume of electrolytes and power generation can be added by increasing the number of battery stacks.

Embodiments of the present disclosure improve upon the design of flow batteries by providing charging systems including modular and scalable flow battery systems with separate and independent battery stacks for charging and discharging. In one embodiment, the use of multiple charge and discharge stacks can allow the modular and scalable flow battery systems to simultaneously charge and discharge.

In another embodiment, multiple charge and discharge stacks can be contained on separate electrolyte systems (e.g., one or more pairs of catholyte and anolyte storage vessels). The charge stacks can charge a single electrolyte system while the discharge stacks can remove energy from a different electrolyte system. When a given electrolyte system reaches a predetermined charge or discharge capacity, a valve system can switch the mode of operation of that electrolyte system (e.g., from charging to discharging or from discharging to charging).

In a further embodiment, a common direct current (DC) bus can be employed to facilitate electrical communication between multiple components of a flow battery system, one or more loads, and/or one or more power sources. Cells contained within a single battery stack and/or two or more battery stacks can be connected to one another through the common bus via DC-DC converters. The power source can be connected to the common DC bus via an electrical conversion device (e.g., an AC to DC rectifier, a DC to AC inverter, etc.). A load can be electrically connected to the common DC bus by a DC-DC converter. Thus, one or both of the flow battery system and the power source can be selected to supply power to the load at a substantially constant, predetermined, voltage to the load. The selection can be based upon one or more considerations such as operating cost, time, quality of service, etc.

Embodiments of the modular and scalable flow battery systems can provide a buffer between an electrical grid or other electrical power source and a charging system configured to charge electrical vehicles. Thus, the number of high voltage direct current power transmission lines (DC ties) required to support high power vehicle charging at a national scale can be reduced. Furthermore, such systems can be configured to discharge stored electrical energy to electric vehicles when grid energy demand is high and to store electrical energy for future electric vehicle charging when grid energy demand is low. In this manner, relatively high tariff and demand charges associated with high power demand times can be avoided.

As an example, the modular and scalable flow battery systems can be charged from a power source (e.g., an electrical grid, a renewable energy source, etc.) at a first rate and be simultaneously discharged to a load (e.g., one or more charging terminal of an electrical vehicle charging station) at a second rate, different from the first rate. In one aspect, the first rate can be less than the second rate, and the power output by the flow battery system is greater than power supplied to the modular and scalable flow battery system, resulting in net discharge of the flow battery system. In another aspect, the first rate can be greater than the second rate and the power output by the flow battery system is less than power supplied to the flow battery system, resulting in net charging of the modular and scalable flow battery system. In this manner, the modular and scalable flow battery system can draw less power from a power source at times of peak demand (e.g., daytime hours, weekdays, etc.)

and draw more power from the power source at times of off-peak demand (e.g., nighttime hours, weekends, etc.). When the power source is the electrical grid, this configuration can reduce power demands on the electrical grid. Furthermore, the modular and scalable flow battery system could discharge to the electrical grid for support under brownout/blackout conditions. When the power source is a renewable energy source, it can smooth out the inherent intermittency of supplied power.

Embodiments of the modular and scalable flow battery system are discussed in the context of certain energy sources, such as an electrical grid or renewable energy source, and loads, such as electrical vehicle charging stations. However, the modular and scalable flow battery system can be utilized with any energy source and loads without limit.

Overview of Redox Flow Batteries

Figure 2A:
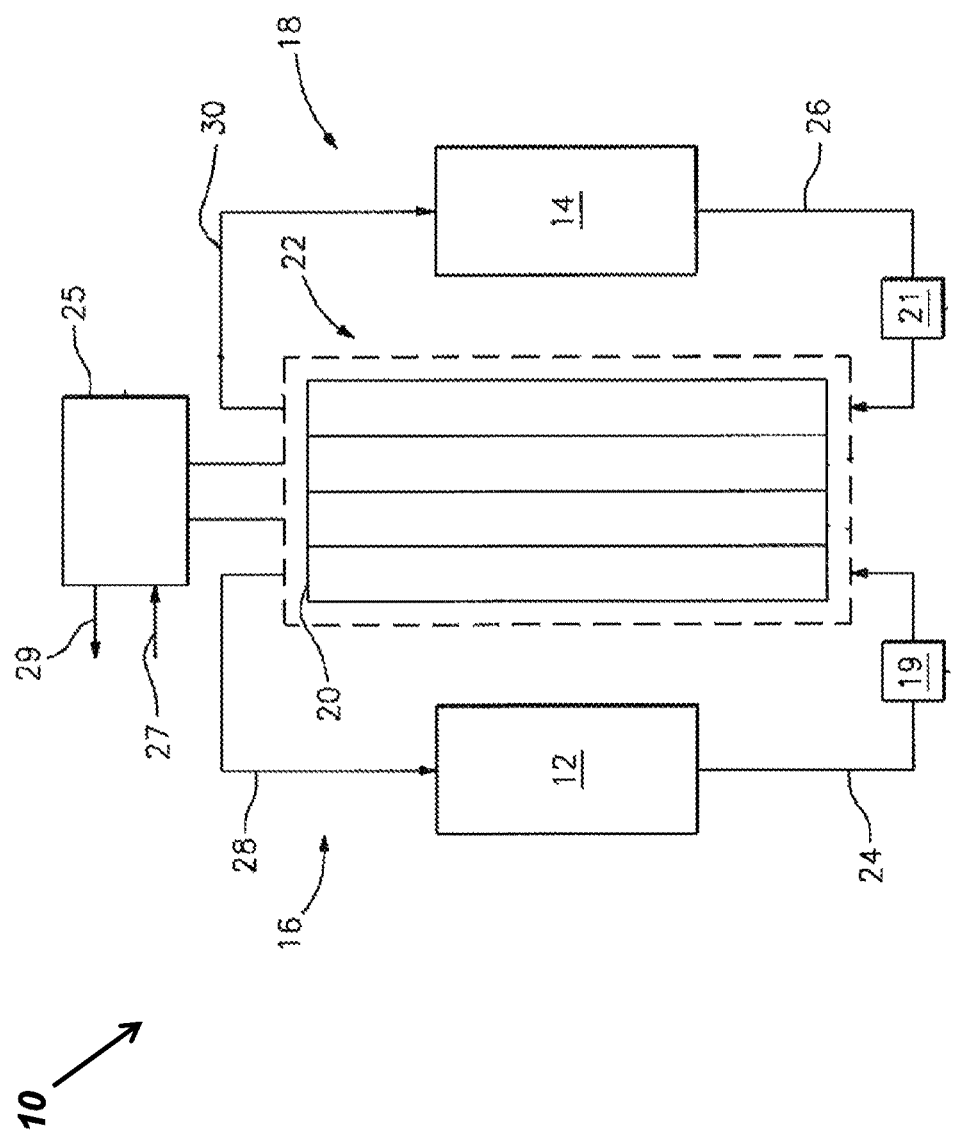
FIG. 2A is a schematic diagram illustrating an embodiment of a flow battery.

FIG. 2A is a schematic diagram illustrating one exemplary embodiment of a flow battery system 10. The flow battery system 10 includes a first electrolyte storage tank 12, a second electrolyte storage tank 14, a first electrolyte circuit loop 16, a second electrolyte circuit loop 18, a first flow regulator 19, a second flow regulator 21, one or more flow battery cells 20 arranged in a battery stack 22, a power converter 25, a controller (not shown), energy input 27, and energy output 29. The first and second electrolyte storage tanks 12 and 14 can each be adapted to hold and store one of a pair of electrolyte solutions. Examples of suitable electrolyte solution pairs can be based on vanadium, bromine, iron, chromium, zinc, cerium, lead, sulfur, or any suitable combination thereof.

During operation of the flow battery system 10, the liquid electrolytes containing redox active species are circulated through one or more flow battery cells 20 of the battery stack 22 to convert chemical energy to electrical energy for power generation. A person skilled in the art will appreciate that the redox reactions can be reversible to convert electrical energy to chemical energy for energy storage. For example, the first and second electrolyte circuit loops 16 and 18 each include a respective source conduit 24, 26, and a return conduit 28, 30. The first and second flow regulators 19 and 21 are each adapted to selectively regulate flow of one of the electrolyte solutions through a respective one of the electrolyte circuit loops 16, 18 in response to control signals from the controller. Each of the flow regulators 19, 21 can include a single device, such as a variable speed pump or an electronically actuated valve, or a plurality of such devices, depending upon the particular design requirements of the flow battery system 10. Embodiments of the present disclosure, however, are not limited to any particular type of flow regulator.

Figure 2B:
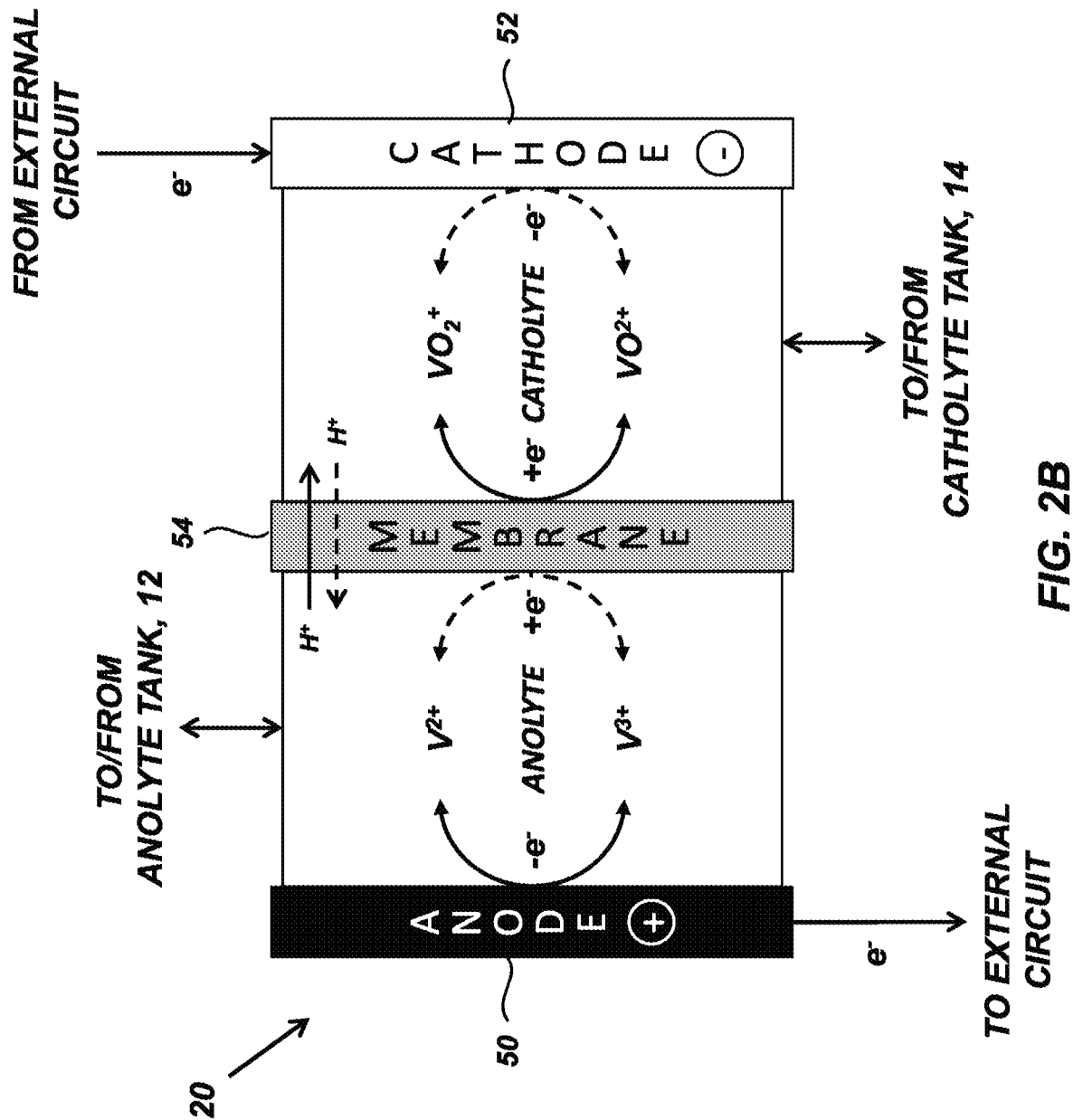
FIG. 2B is a schematic diagram illustrating an embodiment of an electrochemical cell of a battery stack of the flow battery of FIG. 2A.

FIG. 2B is a diagram illustrating one exemplary embodiment of a battery cell 20 of the battery stack 22 and representative redox reactions that can convert chemical energy of the liquid electrolytes into electrical energy. The battery cell 20 includes a porous, negative electrode (anode) 50, a porous positive electrode (cathode) 52, and a separator or membrane 54 interposed there between. The porous negative electrode 50 is in fluid communication with the liquid electrolyte of the first electrolyte storage tank 12, referred to as an anolyte, and the porous positive electrode 52 is in fluid communication with the liquid electrolyte of the second electrolyte storage tank 14, referred to as a catholyte. The positive and negative electrodes are further in electrical communication with an external circuit.

In some implementations, the battery cell 20 forms a portion of a vanadium-vanadium (e.g., all-vanadium) redox flow battery. As an example, the liquid electrolyte for vanadium redox flow batteries can be vanadium sulfate dissolved in sulfuric acid. Concentrations of vanadium sulfate and sulfuric acid can be selected from the range of about 1-2 M to about 4-5 M, respectively. Redox couples for an all-vanadium system are presented below in Equations 1 and 2. The sulfate spectator species ($SO_4$) is not shown for clarity.

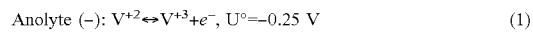

Anolyte (−): $V^{+2} \leftrightarrow V^{+3} + e^-$, $U° = -0.25$ V  (1)

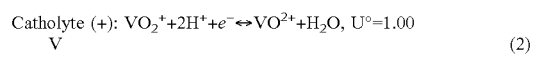

Catholyte (+): $VO_2^+ + 2H^+ + e^- \leftrightarrow VO^{2+} + H_2O$, $U° = 1.00$ V  (2)

Negative and positive half-cell reactions each occur at the surface of the anode 50 and cathode 52. In an example, the anode 50 and cathode can be formed from a carbon-based paper and they can be separated by separator 54, such as a perfluorinated sulfonic acid (PFSA)-based proton exchange membrane. The separator 54 allows protons to transfer charge between battery cells 20 while minimizing crossover of vanadium. In the battery stack 22, the battery cells 20 can be electrically connected in series through graphite bipolar plates (not shown) which contains flow channels for bulk electrolyte transport to and from each of the battery cells 20. The battery cells 20 can be fed electrolyte in parallel through a common manifold integrated into the battery stack 22.

Embodiments of the systems and techniques discussed herein can employ all-vanadium redox flow batteries. However, other flow batteries can also be used. All-vanadium redox flow batteries can provide advantages over other types of redox flow batteries. As an example, other redox chemistries can exhibit incompatibility and/or sensitivity of, the two electrolyte streams to contamination from the other. If a species crosses over and reacts irreversibly with elements in the opposite stream, it can result in efficiency loss on that particular charge/discharge cycle, as well as a loss of capacity and degradation in the overall performance of the flow battery system 10. As a result, expensive maintenance can be required to separate the electrolytes and recover reactants. In contrast, as all-vanadium systems employ vanadium in both the anolyte and catholyte, crossover can represent, at worst, only an efficiency loss as no species are irreversibly consumed or removed from their reactive electrolytic solution.

Figure 3:
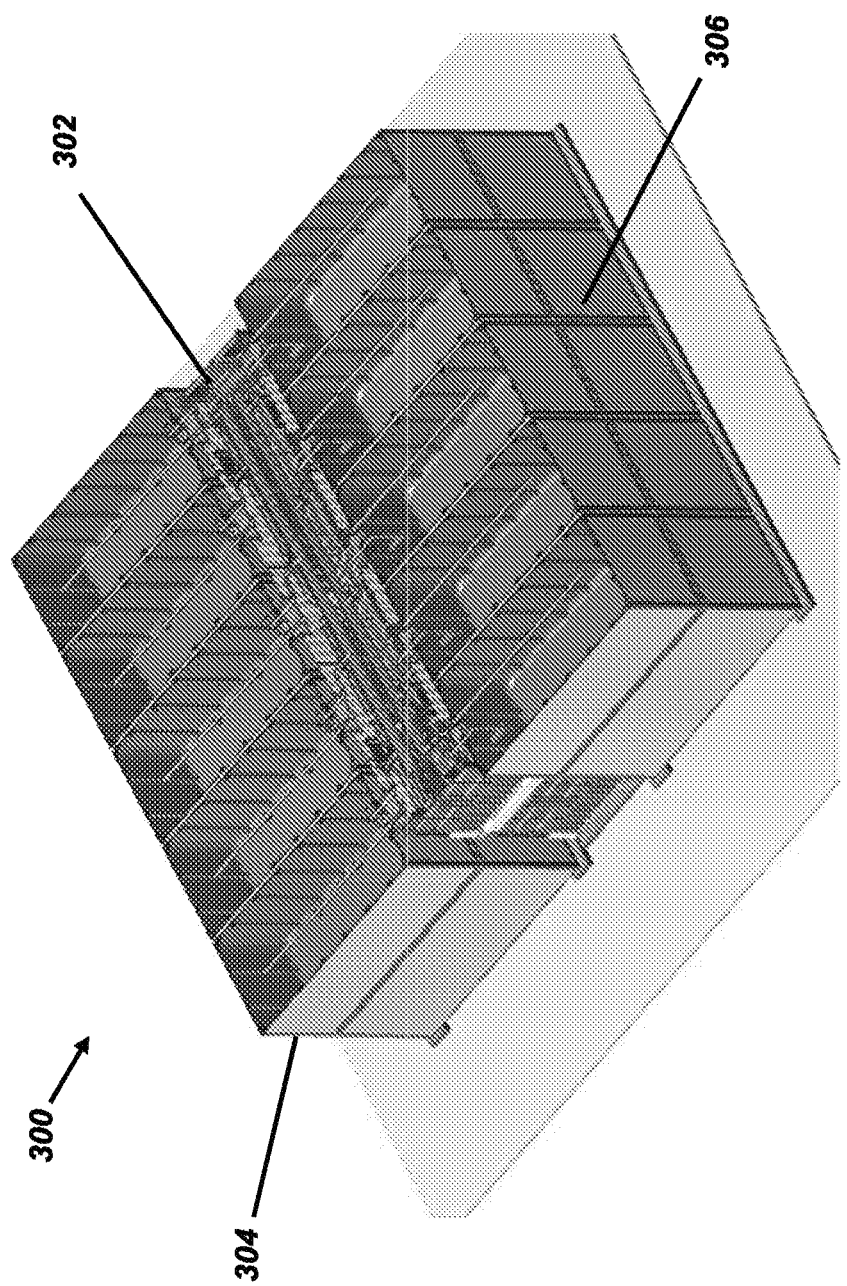
FIG. 3 is a cutaway view of one exemplary embodiment of a modular flow battery including a battery stack container in fluid communication with a plurality of electrolyte containers.

FIG. 3 illustrates one exemplary embodiment of a modular and scalable flow battery in the form of flow battery 300. As discussed in detail below, the flow battery 300 can include a modular design that takes full advantage of the ability of flow batteries to separate power (provided by the stack) from energy (provided by the remotely stored electrolyte). Power of the flow battery 300 can be determined by a number of battery stacks it contains, while energy stored by the flow battery 300 can be determined by how much electrolyte is available for use by the battery stacks. The flow battery 300 can also include battery stacks and electrolyte storage in form factors that can be easy to transport, store, and deploy. As a result, embodiments of the flow battery 300 can provide large-scale energy storage capacity that can be scaled in a rapid and cost-effective manner.

As shown, the flow battery 300 can include at least one battery stack 302, one or more anolyte storage vessel 304, and one or more catholyte storage vessel 306. Each battery stack 302 can be configured for fluid communication with a respective pair of anolyte and catholyte storage vessels 304, 306. As an example, battery stacks 302 can be housed with any electrolyte pumps, supporting plumbing, valves, and control electronics necessary to transfer electrolytes between the battery stacks 302 and the anolyte and catholyte storage vessels 304, 306. Thus, a variable number of pairs of anolyte and catholyte storage vessels 304, 306 can be coupled to each battery stack 302.

In certain embodiments, the battery stack 302 can be configured to generate power using a different anolyte and catholyte. Therefore, the electrolytes stored in the anolyte storage and the catholyte storage can be different. In other embodiments (e.g., all-vanadium flow batteries), the battery stack 302 can be configured to generate power using the same electrolyte for the catholyte and anolyte. Therefore, the liquid electrolyte stored in the anolyte and catholyte storage can be the same.

Each battery stack 302, anolyte storage vessel 304, and catholyte storage vessel 306 can have a form factor that provides ease of transport and deployment on site. As an example, each battery stack 302, anolyte storage vessel 304, and catholyte storage vessel 306 can be provided in respective containers having a form factor satisfying standard dimensions established by the International Organization for Standardization (ISO) for shipping containers. In certain embodiments, the battery stack 302 can adopt a first form factor and the anolyte and catholyte storage vessels 304, 306 can be independently selected to have different form factors. As an example, the battery stack 302 can be provided within ISO standard dimension 40 foot shipping containers, and the anolyte and catholyte storage vessels 304, 306 can be provided within ISO standard dimension 20 foot shipping containers. While embodiments of the flow battery 300 may be discussed in regards to specific dimensions of the battery stack 302, anolyte storage vessel 304, and catholyte storage vessel 306, further embodiments of the flow battery 300 can employ any ISO standard dimension shipping container sizes without limit. Accordingly, the battery stack 302, anolyte storage vessel 304, and catholyte storage vessel 306 can be interchangeably referred to as battery stack containers 302, anolyte storage containers 304, and catholyte storage containers 306 herein.

Beneficially, the container form factor can allow the power and energy storage capability of the flow battery 300 to be rapidly scaled, which can be a significant consideration in the context of large-scale deployments. In one aspect, the standard dimensions of each of the battery stack containers 302 and the anolyte and catholyte storage containers 304, 306 can facilitate transportation from manufacturer to site by ship, rail, and truck, as well as on-site storage and deployment, using existing infrastructure.

In an embodiment, the flow battery 300 can include at least one battery stack container 302 and at least one pair of anolyte and catholyte storage containers 304, 306. For example, assuming each battery stack container 302 is contained within a 10 foot×40 foot container and each of the anolyte and catholyte storage containers 304, 306 is contained within a 10 foot×20 foot container, energy storage equivalent to 0.5 MW for 1 hour can be provided.

Owing to the modular aspects of the flow battery 300, additional battery stack containers 302 and/or pairs of electrolyte storage containers 304, 306 can be added to scale the power and energy storage provided by the flow battery 300 without a large change in its footprint. Three exemplary embodiments of the flow battery 300 having different power generation and energy storage capabilities are illustrated in FIGS. 4A, 4B, and 4C, respectively.

Figure 4:
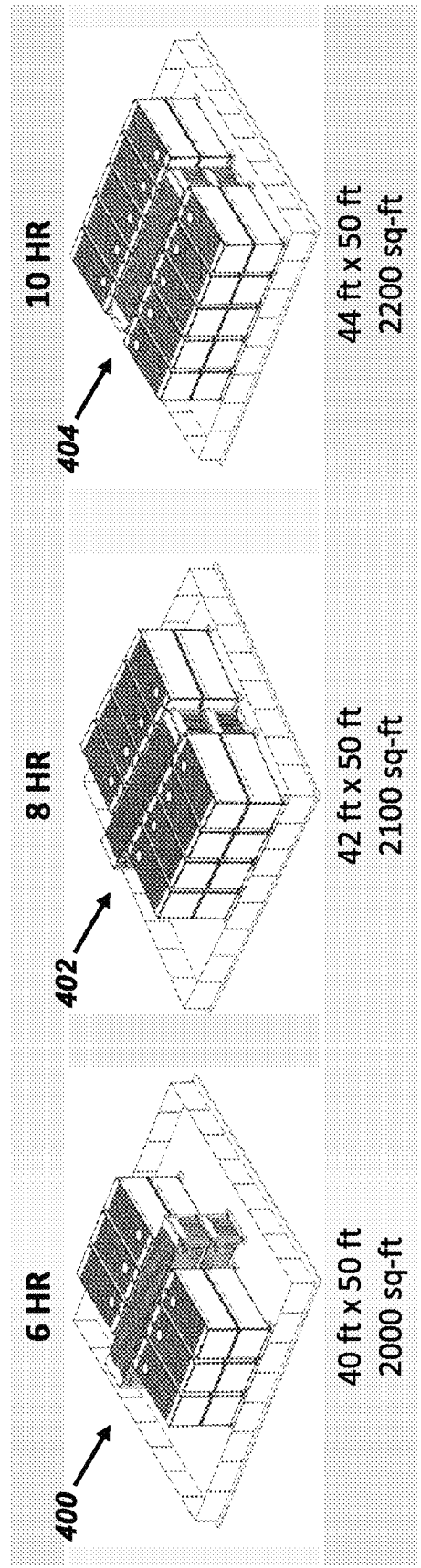
FIGS. 4A-4C illustrate exemplary embodiments of the modular flow battery of FIG. 3 employing varying numbers of electrolyte containers; (4A) 3 pairs of electrolyte containers; (4B) 4 pairs of electrolyte containers; (4C) 5 pairs of electrolyte containers.

The embodiment of FIG. 4A illustrates the flow battery 300 in the form of flow battery 400. The flow battery 400 includes two stacked levels. Each level includes a battery stack container 302 of about 10 foot by 40 foot in fluid communication with three pairs of electrolyte containers 304, 306, each in the form of a 10 foot by 20 foot container. The total area of the flow battery 400 can be about 40 foot by about 50 foot. (2000 ft2) and it can possess an energy capacity of about 1 MW for 6 hr.

The embodiment of FIG. 4B illustrates the flow battery 300 in the form of flow battery 402. Similar to the flow battery 400, the flow battery 402 includes two stacked levels, with each level including a battery stack container 302 of about 10 foot by 40 foot in fluid communication with electrolyte containers 304, 306 of about 10 foot by 20 foot. In contrast to the flow battery 400, the flow battery 402 adds an additional pair of anolyte and catholyte containers 304, 306 to each layer, for a total of four pairs. The total area of the flow battery 402 of FIG. 4B can be about 42 foot by 50 foot (2100 ft$^2$) and its energy capacity can be about 1 MW for 8 hr. The additional 100 ft2 of area can be occupied by overhang of stacked pairs of the anolyte and catholyte storage containers in the front of the battery stack container 302.

The embodiment of FIG. 4C illustrates the flow battery 300 in the form of flow battery 404. Similar to the flow batteries 400, 402, the flow battery 404 includes two stacked levels, with each level including a battery stack container 302 of about 10 foot by 40 foot in fluid communication with electrolyte containers 304, 306 of about 10 foot by 20 foot. The flow battery 404 also includes four pairs of anolyte and catholyte containers 304, 306. The total area of the flow battery 404 of FIG. 4C can be about 44 foot by about 50 foot (2200 ft$^2$) and its energy capacity can be about 1 MW for about 10 hr. The additional 100 ft$^2$ of area can be occupied by overhang of stacked pairs of electrolyte storage containers in the front and back of the battery stack container 302.

From the forgoing, it can be observed that the energy storage capacity of embodiments of the flow battery 300 (e.g., 400, 402, 404) can be significantly increased with a relatively small increase in total occupied area. As shown, for each pair of anolyte and catholyte containers 304, 306 added to flow battery 400, battery storage capacity increases by about 1 MW for about 2 hours with corresponding area increasing by a modest 100 ft$^2$.

Figure 5:
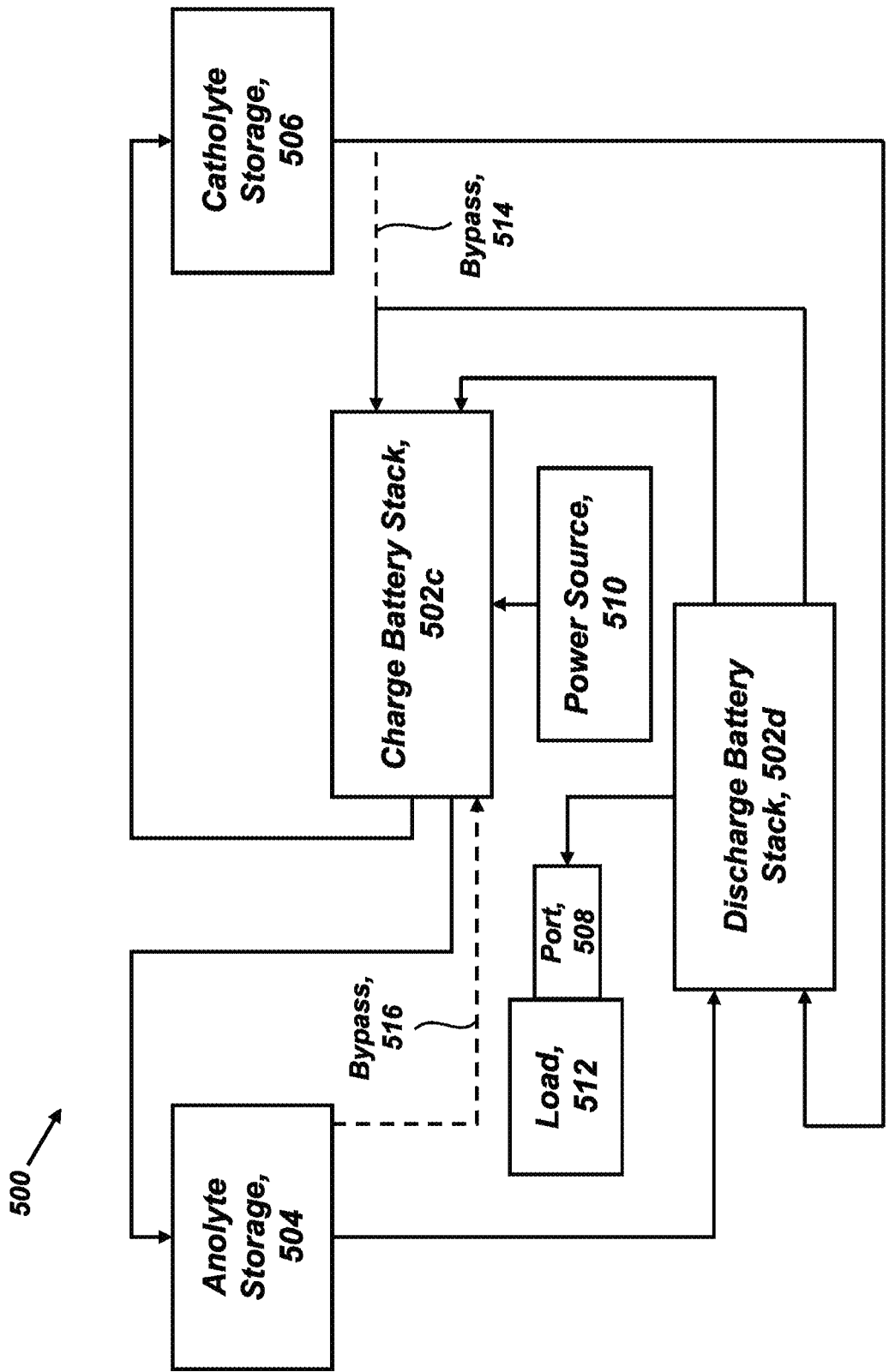
FIG. 5 is a block diagram illustrating one exemplary embodiment of a modular flow battery system including separate charge and discharge battery stacks configured to simultaneously discharge to supply power to an electrical load and charge from a power source to replenish depleted electrolyte solutions.

FIG. 5 is a block diagram illustrating one exemplary embodiment of a flow battery 500 configured for simultaneous charging and discharging. As shown, the flow battery 500 includes a pair of battery stacks 302 in the form of charge battery stack 502c and discharge battery stack 502d. The flow battery 500 further includes a single pair of electrolyte storage vessels 304, 306 in the form of an anolyte storage vessel 504 and a catholyte storage vessel 506.

The charge battery stack 502c is in fluid communication with the anolyte storage vessel 504, the catholyte storage vessel 506, and the discharge battery stack 502d. As shown, the charge battery stack 502c is configured to receive flows of anolyte and catholyte from the discharge battery stack 502d or directly from the anolyte storage vessel 504 and catholyte storage vessel 506 via bypasses 514, 516. The charge battery stack 502c is further configured to output anolyte to the anolyte storage vessel 504 and catholyte to the catholyte storage vessel 506.

The charge battery stack 502c is also in electrical communication with a power source 510. The power source 510 can be any source of electrical power. In certain embodiments, the power source 510 can be an alternating current power source, referred to as 510a herein (e.g., an electrical grid, AC renewables, etc.) In other embodiments, the power source 510 can be a direct current power source, referred to as 510b herein. One or more of the following external systems (not shown) can also be used to facilitate integration of the charge battery stack 502c with the power source 510: inverters (power conversion systems), transformers, controllers (battery side and/or power source side), interconnecting and protection equipment, and chiller-heater units.

The discharge battery stack 502d is in fluid communication with the anolyte storage vessel 504, the catholyte storage vessel 506, and the charge battery stack 502c. As shown, the discharge battery stack 502d is configured to receive flows of anolyte and catholyte directly from the anolyte storage vessel 504 and catholyte storage vessel 506. The charge battery stack 502c is further configured to output anolyte and catholyte to the charge battery stack 502c.

The discharge battery stack 502d is also in electrical communication with an electrical load 512. The load 512 can represent one or more devices that are capable of receiving electrical power from the discharge battery stack 502d. In certain embodiments, the load 512 can be one or more electric vehicle chargers of an electric vehicle charging station.

An input port 508 can be provided to facilitate the electrical connection between the load 512 and the discharge battery stack 502d. The electrical connection between the discharge battery stack 502d and the load 512 can include transmission of power as well as signals according to a vehicle communication protocol. Examples of such protocols are outlined below in Table 1, which provides an overview of level (power output) and type (socket and connector) of electric vehicle supply equipment (EVSE) used in China, Europe, Japan, and North America (NA). Each of the standards in Table 1 is incorporated by reference in their entirety.

catholyte are output from the discharge battery stack 502d to the charge battery stack 502c. The charge battery stack 502c draws power from the power source 510 (e.g., an electrical grid) to return energy to the anolyte and catholyte. The charge battery stack 502c then delivers the recharged anolyte and catholyte to the anolyte storage 504 and catholyte storage vessel 506, respectively. In the charging mode, the anolyte and catholyte can be continuously supplied to the charge battery stack 502c, directly from the catholyte storage vessel 504 and anolyte storage vessel 506 via bypasses 514, 516, maintaining the anolyte and catholyte in a fully charged state. Beneficially, this configuration allows the size of the input service from the power source 510 to be minimized.

Figure 6A:
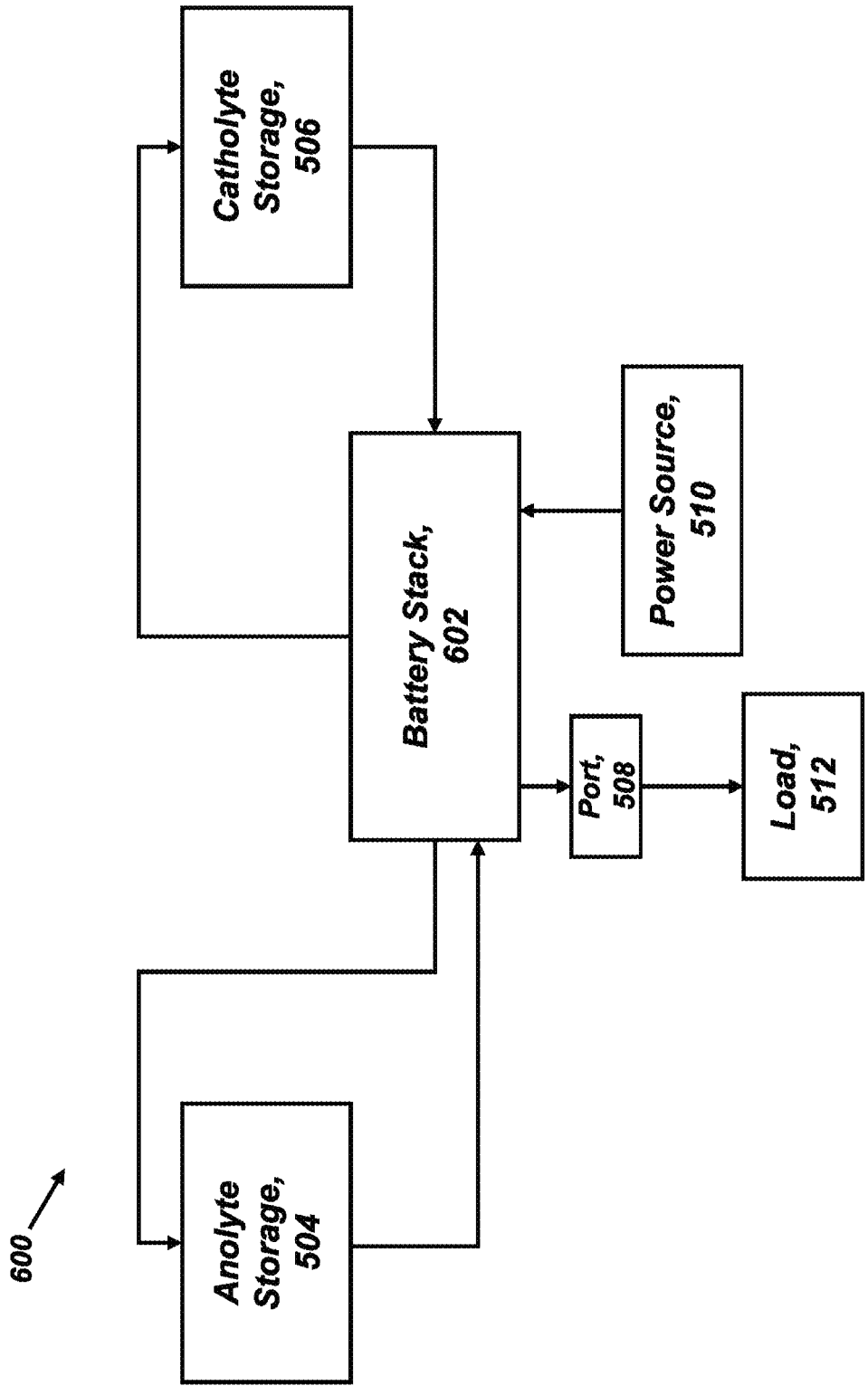
FIG. 6A is a block diagram illustrating one exemplary embodiment of a modular flow battery system including a single battery stack configured to alternatingly discharge to supply power to an electrical load and charge from a power source to replenish depleted electrolyte solutions.

An alternative embodiment of a flow battery is illustrated in FIG. 6A in the form of flow battery 600. In the flow battery 600, a single battery stack 602 replaces the charge battery stack 502c and discharge battery stack 502d and is configured to perform both charging and discharging of electrolyte to provide power to the load 512. In use, the electrical connection of the battery stack 602 to the power source 510 can be turned off during discharge to the load 512 and turned on when charging the electrolyte (e.g., via a switch, not shown).

Figure 6B:
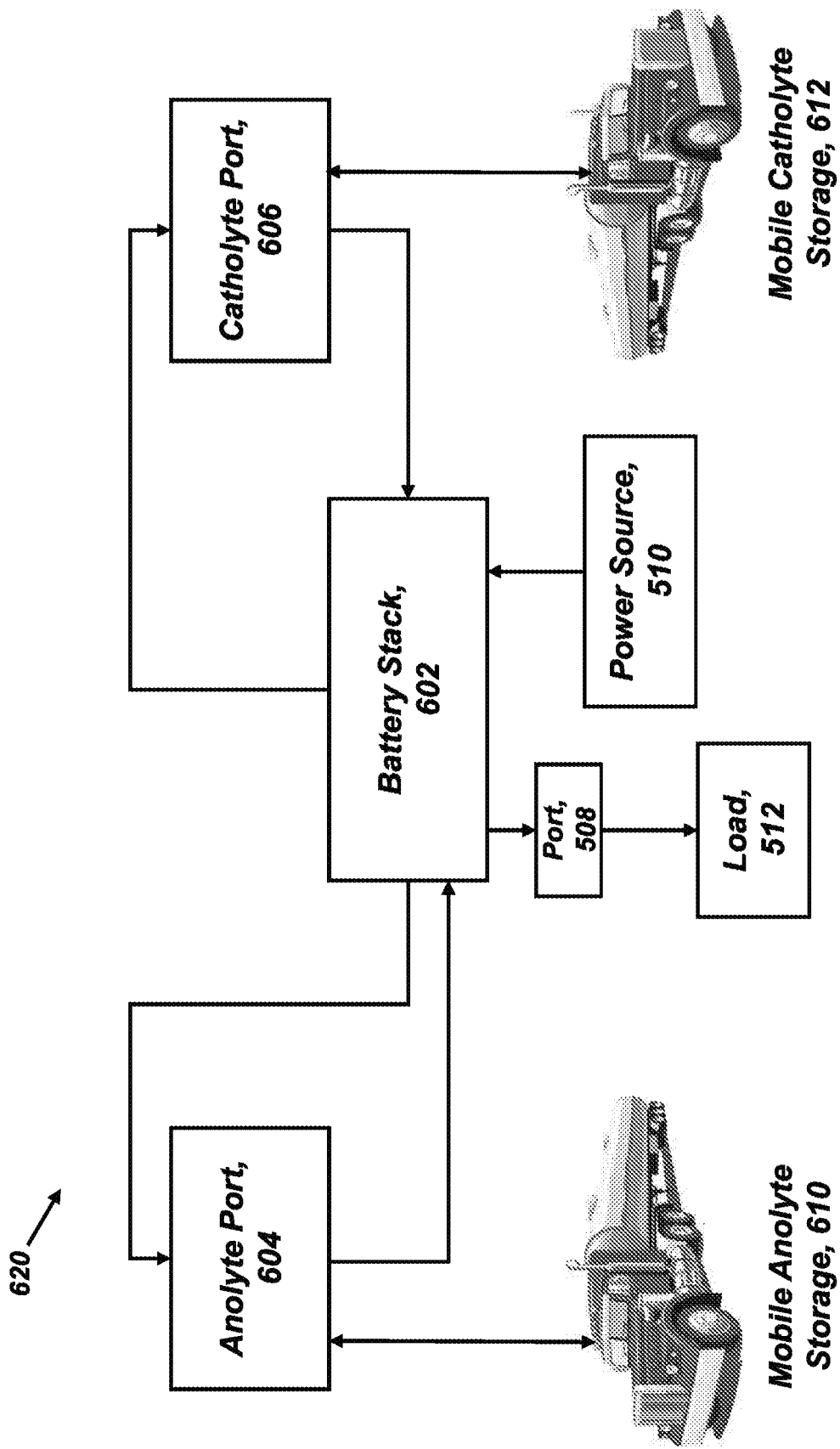
FIG. 6B is a block diagram illustrating one exemplary embodiment of a modular flow battery system including anolyte and catholyte ports configured to fluidly couple to mobile anolyte and catholyte storage vessels.

In another embodiment, illustrated in FIG. 6B, the single battery stack 602 can be part of a system 620 including one or more pairs of ports 604, 606 which are configured for fluid coupling with mobile electrolyte storage vessels 610, 612. As a non-limiting example, the mobile electrolyte storage vessels can take the form of mobile anolyte and catholyte storage vessels 610, 612 that are configured for

TABLE 1

Overview of existing vehicle communication protocols

| Classification | | | | Type | | | |
|---|---|---|---|---|---|---|---|
| discussed | Level | Current | Power | China | Europe | Japan | NA |
| | Level 1 | AC | <3.7 kW | Devices installed in private households, the primary purpose of which is not recharging electric vehicles | | | SAE J1772 Type 1 |
| Slow Chargers | Level 2 | AC | >3.7 kW and ≤22 kW | GB/T 20234 AC | IEC 62196 Type 2 | SAE J1772 Type 1 | SAE J1772 Type 1 |
| | Level 2 | AC | ≤22 kW | | Tesla connector | | |
| Fast Chargers | Level 3 | triphase | >22 kW and <43.5 kW | | IEC 62196 Type 2 | | SAE J3068 (under development) |
| | Level 3 | DC | Currently <200 kW | GB/T 20234 DC | CCS Combo 2 Connector (IEC 62196 Type 2 & DC) | CHAdeMO | CCS Combo 1 Connector (SAE J1772 Type 1 & DC) |
| | Level 3 | DC | Currently <150 kW | | Tesla and CHAdeMO connectors | | |

The flow battery 500 can operate in charging and discharging modes. In the discharging mode, one or more loads 512 (e.g., electric vehicles) are placed in electrical communication with the discharge battery stack 502d. The discharge battery stack 502d is activated and draws anolyte and catholyte from the anolyte storage and catholyte storage vessels 504, 506. Upon receipt, redox reactions occur within the discharge battery stack 502d to supply the power necessary to provide a fast charge to an electric vehicle battery. Subsequently, partially or fully discharged anolyte and ease of transportation via truck, either by being integrated into a semi-trailer or by having dimensions similarly suitable for attachment to a tractor-trailer. In such a design, when the anolyte storage vessel 504 or the catholyte storage vessel 506 becomes partially or fully discharged, it can be taken to a charging station and replaced with a new fully charged anolyte storage tank or catholyte storage tank. The charging station can be either onsite or offsite. Charging anolytes and/or catholytes offsite can be useful for avoiding potential cost constraints of energy production due to where the flow battery system 620 is located and/or the availability of an alternative energy source elsewhere. Once charged, the mobile electrolyte storage vessels 610, 612 can be brought back to the system 620 for powering purposes or to provide energy in times of brownout/blackout. In this manner, rapid changing of the electrolyte and catholyte supply can be accomplished.

Figure 7:
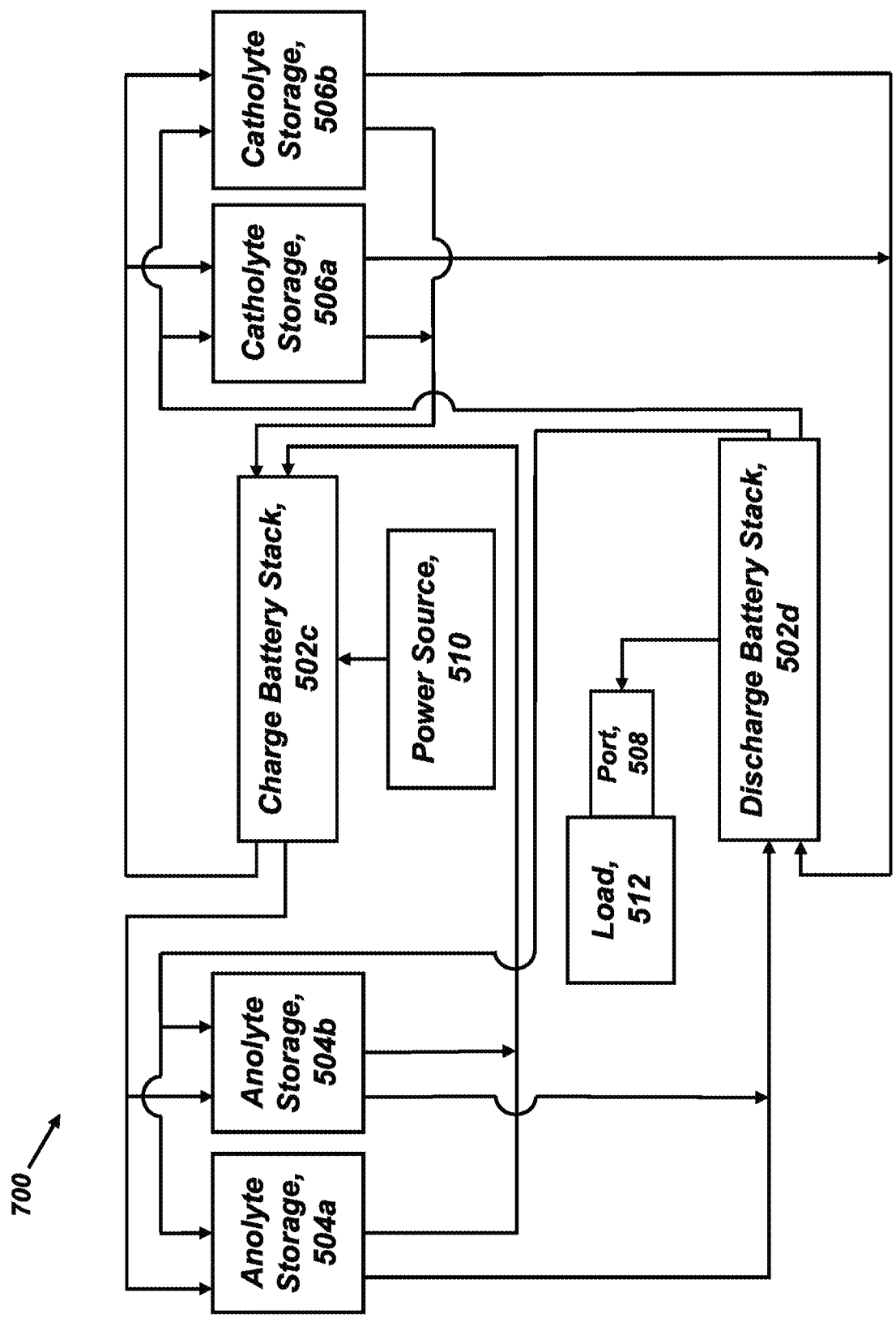
FIG. 7 is a block diagram illustrating one exemplary embodiment of a modular flow battery system including separate charge and discharge battery stacks and multiple pairs of electrolyte storage.

A further embodiment of a flow battery is illustrated in FIG. 7 in the form of flow battery 700. As shown, the flow battery 700 includes the charge battery stack 502*c* and discharge battery stack 502*d*, as discussed above, in fluid communication with multiple pairs of electrolyte storage vessels (e.g., 504*a*, 504*b*, 506*a*, 506*b*). Any combination of number of anolyte and catholyte storage tanks is suitable, as configuration for a greater number of tanks can allow for the modular and readily scalable design of a charging station. The charge battery stack 502*c* and the discharge battery stack 502*d* each operate using its own electrolyte storage vessels, which can be switched.

As discussed in greater detail below, these pairs of electrolyte storage vessels can be stationary, mobile, or a combination of both. As an example, when a first electrolyte storage pair is fully discharged (e.g., 704*a*, 706*a*), valves (not shown) can be switched to reconfigure flow pathways of the flow battery 700. Thus, the electrolyte flow from the first electrolyte storage pair 704*a*, 706*a* can be changed from fluid communication with the discharge battery stack 502*d* to fluid communication with the charge battery stack 502*c*. Concurrently, electrolyte flow from a second electrolyte storage pair that is fully charged (e.g., 704*b*, 706*b*) can be changed from fluid communication with the charge battery stack 502*c* to fluid communication with the discharge battery stack 502*d*. In this manner, the depleted first electrolyte storage pair 704*a*, 706*a* can be recharged and the charged second electrolyte storage pair can be depleted to deliver power to the load 512.

Figure 8A:
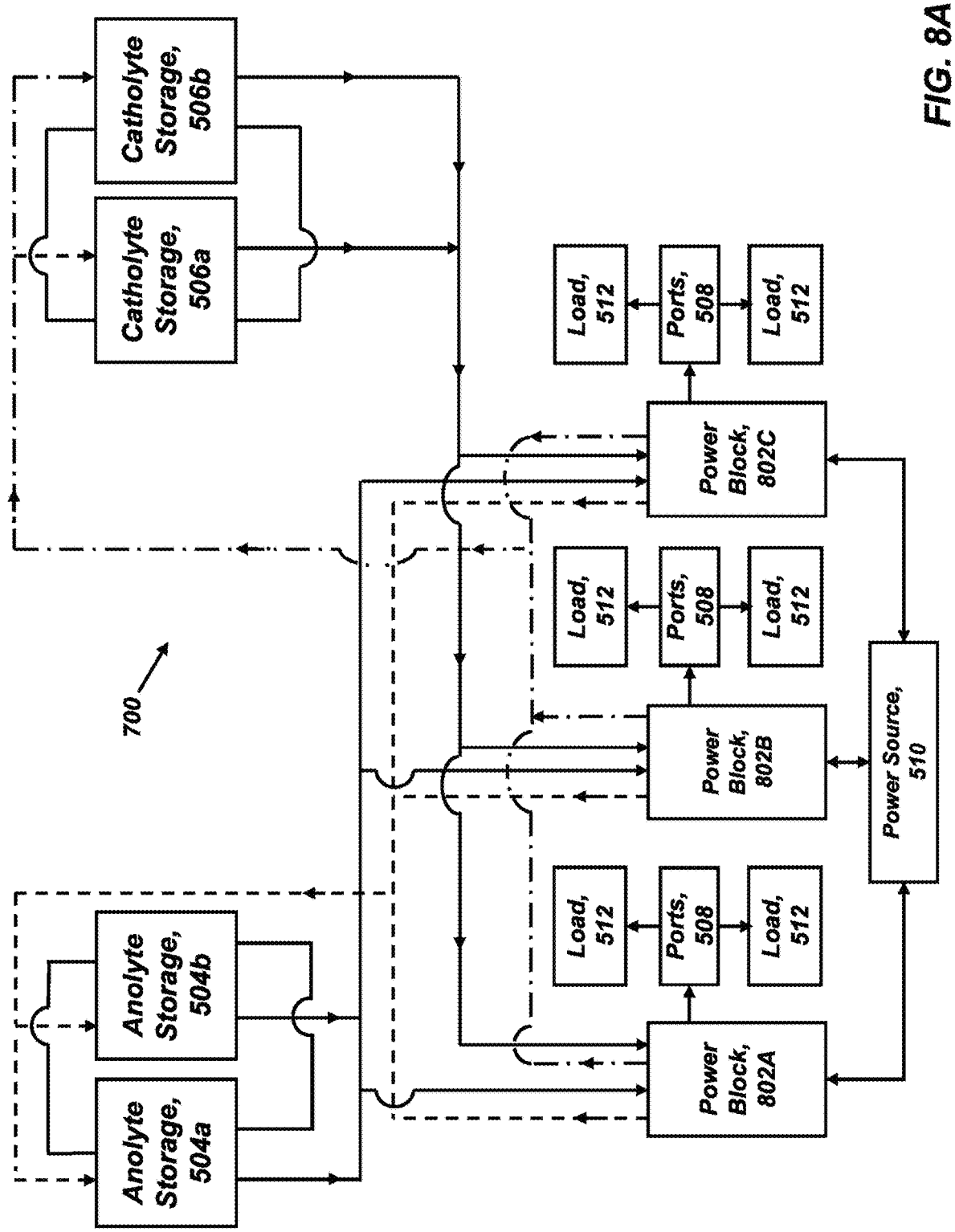
FIG. 8A is a block diagram illustrating one exemplary embodiment of a modular flow battery system including power blocks in communication with respective anolyte and catholyte storage vessels.

A further embodiment of a flow battery is illustrated in FIG. 8A in the form of flow battery 800. The flow battery 800 includes at least one pair of anolyte and catholyte storage vessels 504, 506 in electrical communication with at least one power block 802. The flow battery 800 can be configured for electrical communication with power source 510 and one or more loads 512 (e.g., an electrical vehicle) via ports 508.

As discussed above, anolyte and catholyte storage vessels 504, 506 and power blocks 802 can be added or removed from the flow battery 800 to scale the energy storage and power output. For example, as shown in FIG. 8A, the flow battery 800 includes at least two pairs of electrolyte storage vessels (e.g., 504*a*, 504*b*, 506*a*, 506*b*) in electrical communication with two or more power blocks 802 (e.g., 802*a*, 802*b*, 802*c*).

Figure 8B:
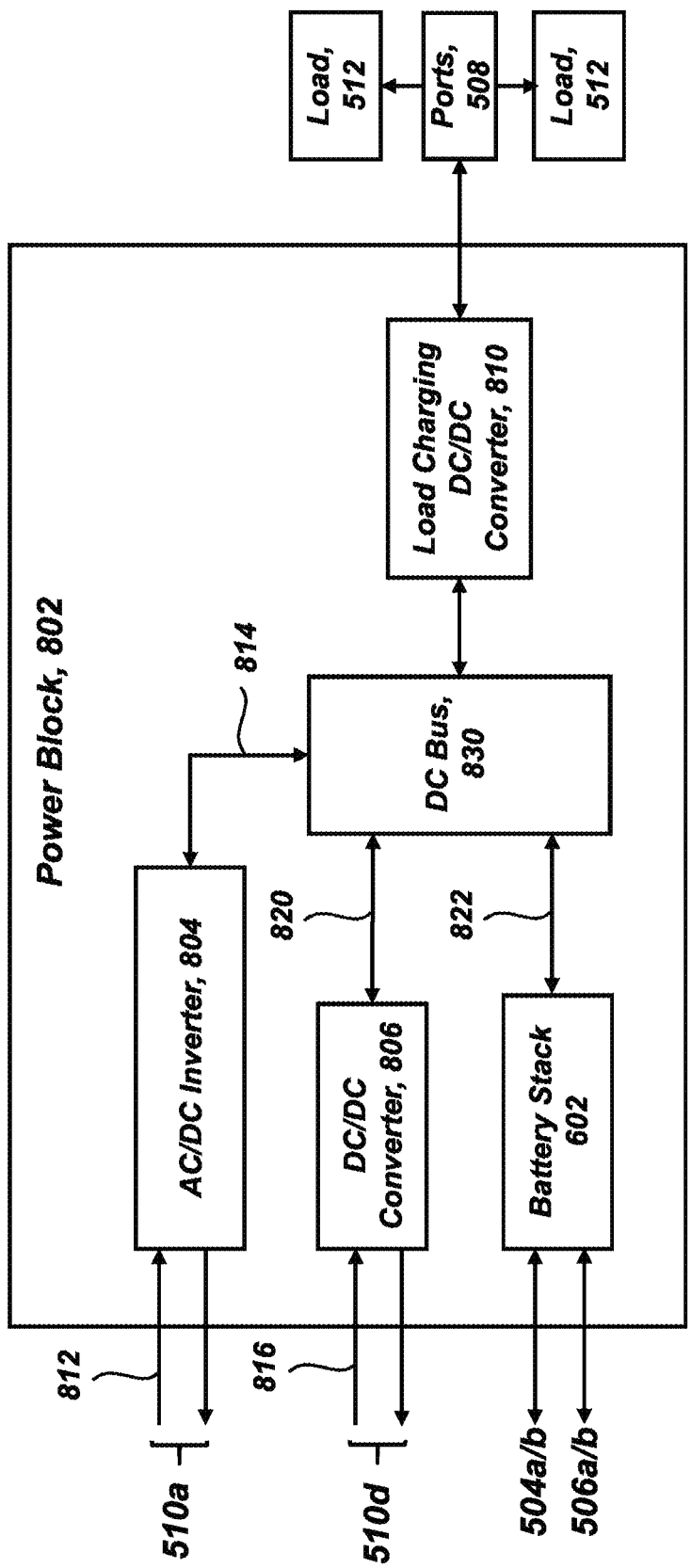
FIG. 8B is a block diagram illustrating one embodiment of a power block of the system of FIG. 8A.

As illustrated in FIG. 8B, each power block 802 can include at least one battery stack 602, at least AC/DC inverter 804, at least one DC/DC converter 806, and at least one load charging DC/DC inverter 810. In certain embodiments, the at least one AC/DC inverter 804 can include multiple ports and be configured for input and output of AC and DC. The at least one AC/DC inverter 804 can also be multi-directional (e.g., bi-directional). As an example, the AC/DC inverter 804 can be configured to receive an AC input and output DC at a predetermined voltage. In alternative embodiments, not shown, the AC/DC inverter 804 can be provided externally of the power block 802. The function of the AC/DC inverter 804, discussed in detail below, can remain unchanged in either configuration.

The at least one DC/DC converter 806 can include multiple ports and be a configured to receive DC at one voltage and output DC at a different voltage. As an example, the at least one DC/DC converter 806 can be a tri-port DC-DC-DC or DC-DC-AC converter for advanced applications such as solar+EV charging, where power flows might need to be flexibly controlled. In certain embodiments, at least one DC/DC converter 806 can be multi-directional (e.g., bi-directional). As discussed in greater detail below, embodiments of multi-directional DC/DC converters can be configured to provide one or more of the following.

Voltage droop sharing.
Intelligent mesh network control.
Maximum power point tracking (MPPT) plus voltage droop.
   Direct connection to photovoltaic (PV) systems at the DC level.
   Quick retrofit into existing PV systems.
Separable inputs and outputs for multi-port DC system.
Flexible, software configurable EV charging interface built into converter.
Integrated use of solar+energy storage+EV charging+ electrical grid ancillary services.

As an example, the AC/DC inverter 804 can receive a first AC 812 input from an AC power source 510*a* and output a first DC 814 at a first voltage. Alternatively or additionally, the DC/DC converter 806 can receive a second DC 816 at a second voltage from a DC power source 510*d* and output a third DC 820 at a third voltage. The battery stack 602 can receive electrolyte from anolyte storage vessels 504*a*, 504*b*, and catholyte storage vessels 506*a*, 506*b* and output a fourth DC 822 at a fourth voltage.

Each power block 802 can also include a DC bus 830 capable of controlling flow of current between the AC/DC inverter 804, the DC/DC converter 806, the battery stack 602, and the load charging DC/DC inverter 810. As shown, the first, third, and fourth DC 814, 820, 822 output by the AC/DC inverter 804, the DC/DC converter 806, the battery stack 602, respectively, can be received by the DC bus 830.

In one aspect, the DC bus 830 can be configured to control which of the first, third, and fourth DC 814, 820, 822 is used to charge the load 512. In one embodiment, the load 512 can be charged from the AC power source 510*a* only by directing the first DC 814 to the load charging DC/DC converter 810. In another embodiment, the load 512 can be charged only from the DC power source 510*d* by directing the third DC 820 to the load charging DC/DC converter 810. In a further embodiment, the load 512 can be charged only from the battery stack 602 by directing the fourth DC 822 to the load charging DC/DC converter 810. In alternative embodiments, any combination of the first, third, and fourth DC 814, 820, 822 can be employed for charging the load 512.

In another aspect, the DC bus 830 can be configured to control flow of current back to one or more of the AC/DC inverter 804, the DC/DC converter 806, the battery stack 602. Flow of current back to the AC/DC inverter 804 or the DC/DC converter 806 can be supplement the AC power source 510*a* or the DC power source 510*d*. For example, when the AC power source and the DC power source 510*d* are an electrical grid, supplying power to the AC power source 510*a* and/or the DC power source 510*d* can be beneficial under brown out/black out conditions. Flow of current back to the battery stack 602 can be employed to recharge depleted electrolyte.

In further embodiments, the DC bus 830 can receive DC from the load 512. As an example, when the load is an EV, the battery of the EV can be discharged to the load charging DC/DC converter 810. The load charging DC/DC converter 810 can subsequently supply DC to the DC bus 830 and the DC bus 830 can direct this DC to at least one of the AC/DC inverter 804, DC/DC converter 806, or the battery stack 602, as discussed above.

In additional embodiments, the power blocks 802 can be dedicated to charging the anolyte and catholyte storage vessels 504a, 504b, 506a, 506b, if required. As an example, the power blocks 802 can be configured to control flow of the anolyte and catholyte received from the anolyte and catholyte storage vessels 504a, 504b, 506a, 506b to charge and discharge the anolyte and catholyte.

In further embodiments, flow battery systems are provided that include a single, common DC bus in common communication with one or more power source(s), flow battery stacks, and loads (e.g., electric vehicles). Under some circumstances, the use of a common DC bus can provide advantages over the individual DC buses 830 discussed above. As an example, a common DC bus can be easier and less costly than a number of individual DC buses 830.

Figure 9:
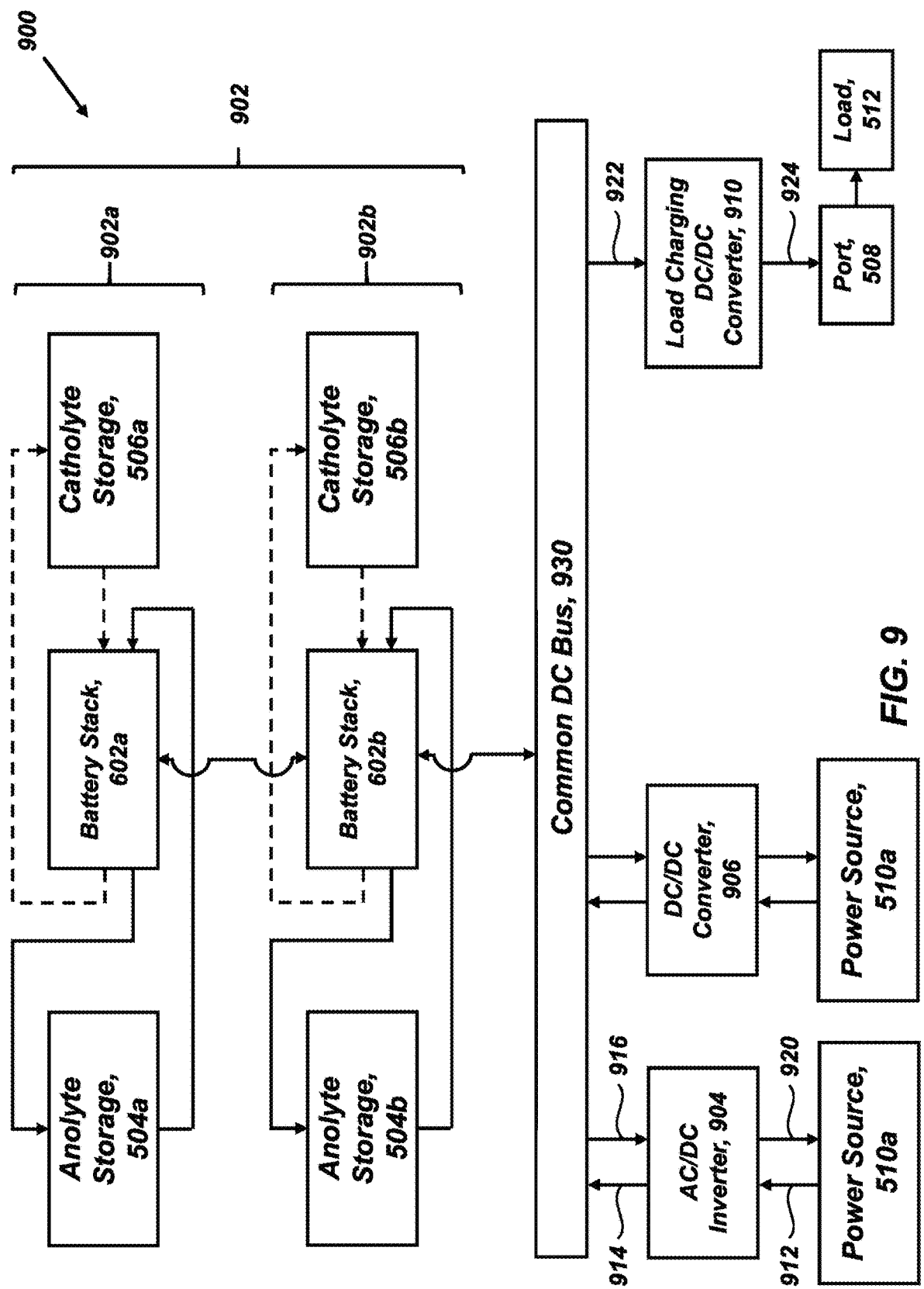
FIG. 9 is a block diagram illustrating one exemplary embodiment of a modular flow battery system including a common DC bus in electrical communication with at least one flow battery, at least one power source, and at least one load.

FIG. 9 illustrates one embodiment of a flow battery system 900 including a common DC bus 930. The common DC bus 930 can be configured for electrical communication with one or more flow batteries 902, one or more power sources 510, and one or more loads 512. As shown, the power source 510 and flow batteries 902 can send/receive electrical power to/from the common DC bus 930, while the load 512 can receive electrical power from the common DC bus 930 via a load charging DC converter 910.

The common DC bus 930 is configured for electrical communication with one or more power sources 510 (e.g., AC power sources 510a, DC power sources 510d, and combinations thereof). In one embodiment, the common DC bus 930 can communicate with an AC power source 510a via AC/DC inverter 904. The AC/DC inverter 904 functions similarly to the AC/DC inverter 804 and can be used to convert AC received from the AC power source 510a to DC suitable for receipt by the common DC bus 930.

As discussed above, the AC/DC inverter 904 can be a multi-port, multi-direction inverter configured to change AC 912 received from the AC power source 510a into a first DC 914 at a first voltage and output the first DC 914 to the common DC bus 930. The AC/DC inverter 904 can also be configured to receive second DC 916 at a second voltage from the common DC bus 930 and output a third AC 920 to the AC power source 510a.

The load charging DC/DC converter 910 can be configured to receive a fourth DC 922 at a fourth voltage as input from the common DC bus 930 and output a fifth DC 924 at a fifth voltage for receipt by the load 512. While not shown, the load charging DC/DC converter can also be configured to receive DC from the load and convert the received DC to a voltage suitable for receipt by the common DC bus.

In another embodiment, the common DC bus 930 can communicate with a DC power source 510d via a DC/DC converter 906. The DC/DC converter 906 can be configured to convert DC output by the DC power source 510d to a DC voltage level suitable for receipt by the common DC bus 930. If multi-directional (e.g., bi-directional), the DC-DC converter 906 can also be employed to convert the DC output by the common DC bus 930 to a voltage suitable for receipt by the DC power source 510d.

In this configuration, the AC/DC inverter 904, the DC/DC converter 906, and/or the load charging DC/DC converter 910 controls the voltage of the common DC bus 930. By increasing the voltage of the common DC bus 930 above the open circuit voltage of the one or more flow batteries 902, the one or more flow batteries 902 can be charged. Conversely, decreasing the voltage of the common DC bus 930 below the open circuit voltage of the one or more flow batteries 902, the one or more flow batteries 902 can be discharged.

AC/DC inverters and DC/DC converters employed with power sources, such as electrical grids, operate at relatively high voltage. As an example, the AC/DC inverter 904 and DC/DC converter 906 can operate at a minimum voltage of 500 VDC to 800 VDC. Thus, the minimum voltage of the common DC bus 930 is also 500 VDC to 800 VDC.

This minimum voltage of the common DC bus 930 can also be supplied by the flow batteries 902. Assuming typical operating values for flow battery cells, 1 VDC (discharge) and 1.6 VDC (end of charge), a single battery stack including 500 flow battery cells in series is capable of maintaining the common DC bus 930 at 500 VDC to 800 VDC minimum voltage. However, employing on-series, connected flow battery cells at 500 VDC to 800 VDC can result in high shunt currents (parasitic ionic current flows through the electrolyte). These shunt currents can result in low coulombic efficiency and, potentially, corrosive damage, each of which can shorten the operating life of the battery stacks.

To mitigate and/or avoid shunt current problems in the flow battery system 900, multiple flow batteries can be employed, each in fluid communication with its own set of electrolyte storage vessels, rather than a single flow battery. As shown, the plurality of flow batteries 902 includes flow batteries 902a, 902b. The flow battery 902a includes anolyte storage vessel 504a, catholyte storage vessel 506a, and battery stack 602a, while the flow battery 902b includes anolyte storage vessel 504b, catholyte storage vessel 506b, and battery stack 602b. While the plurality of flow batteries 902 is illustrated with a single pair of electrolyte storage vessels, in further embodiments, additional electrolyte storage vessels can be employed.

In one embodiment, the two battery stacks 602a, 602b can each include 250 cells in series and provide approximately 250 VDC to 400 VDC. Alternatively, four battery stacks of 125 cells each can be provided in series, each providing approximately 125 VDC to 200 VDC. Other battery stack configurations can be employed without limit. In this manner, each battery stack of the plurality of battery stacks is essentially isolated, reducing the effect of shunt currents. in series with a plurality of flow batteries 902.

The configuration of the plurality of battery stacks can be adjusted, depending upon the voltage of the common DC bus. As an example, increasing the operating voltage of the common DC bus to accommodate higher capacity power sources when the AC/DC inverter 904 is configured to operate at higher voltage (e.g., up to about 1500 VDC).

It can be appreciated, however, that using multiple pairs of anolyte and catholyte storage vessels can present challenges. In one aspect, multiple pairs of anolyte and catholyte storage vessels can constrain system design. For example, dividing overall capability into 2 or more individual flow systems may constrain the ability to optimize the number of battery stacks, size of electrolyte storage vessels, etc. In another aspect, multiple pairs of anolyte and catholyte storage vessels can present an electrochemical balancing issue. In general, multiple flow batteries operating together should be balanced to contain the same quantity of and state of charge of electrolyte in order to achieve optimum performance. If not, all flow batteries will operate at the performance of the weakest. For example, in a system of three flow batteries, when the one flow battery shuts down due to full discharge, the other two would shut down, even if they have charge remaining.

Figure 10:
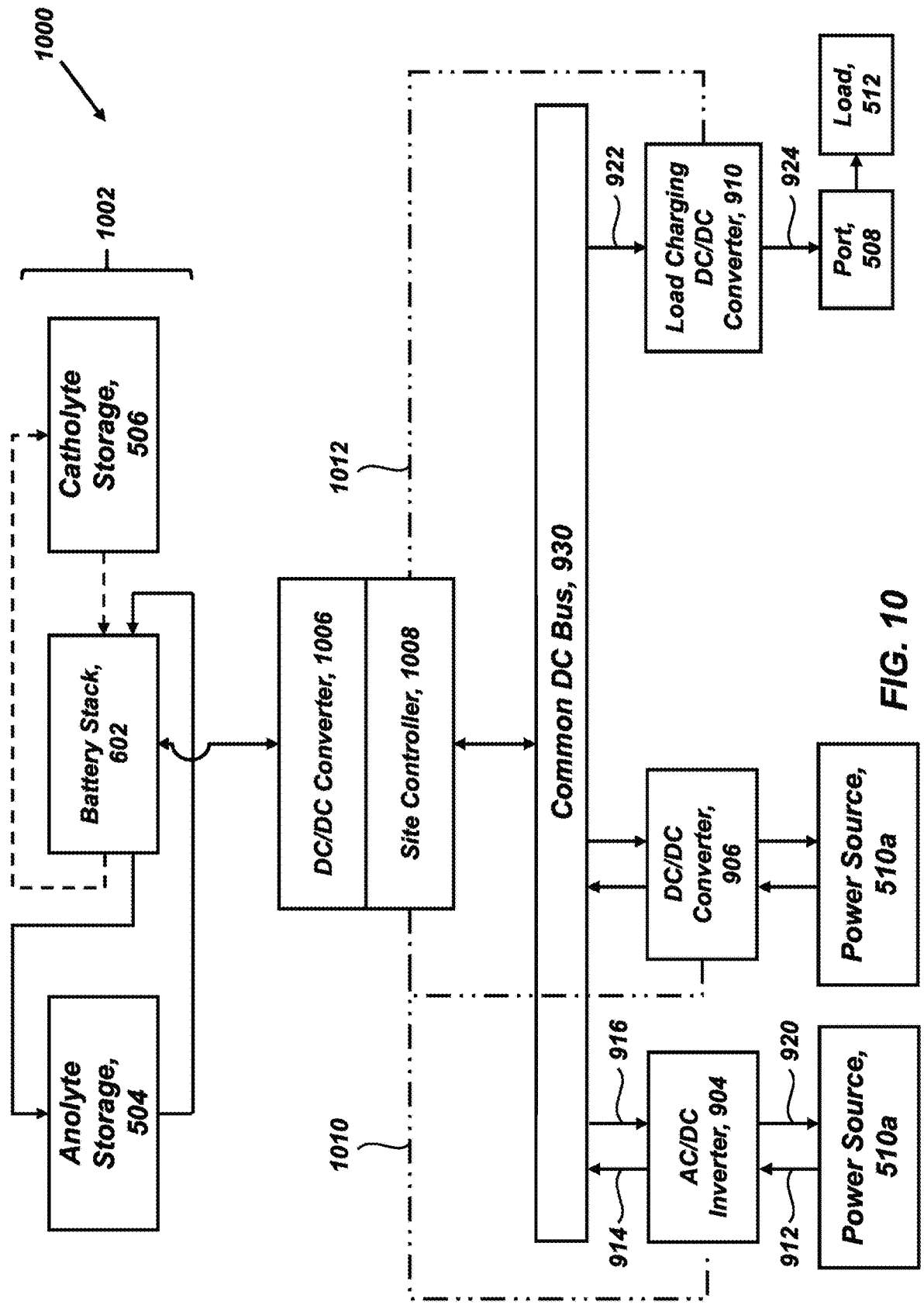
FIG. 10 is a block diagram illustrating one exemplary embodiment of a modular flow battery system including a common DC bus in electrical communication with at least one flow battery via a DC/DC converter operatively controlled by a site controller.

For these reasons, the flow battery system 900 can be modified to include a DC/DC converter 1006 and a site controller 1008 in communication with a flow battery 1002, as illustrated in the flow battery system 1000 of FIG. 10. The DC/DC converter 1006 is interposed between one or more flow batteries 1002 and the common DC bus 930 and can be configured to operate similarly to DC/DC converter 806. That is, the DC/DC converter 1006 can be configured to convert DC received from the flow battery 1002 to a level suitable for receipt by the common DC bus 930, and to convert DC received from the common DC bus 930 to a level suitable for receipt by the one or more flow batteries 1002.

The addition of the DC/DC converter 1006 can allow the flow battery system 1000 to employ fewer flow batteries (e.g., as few as one), as compared to the flow battery system 900, while still achieving a desired DC output. As an example, the output of a single battery stack 602, such as that discussed above containing 250 cells in series (e.g., 250 VDC to 400 VDC), can be converted by the DC/DC converter 1006 to 500 VDC to 800 VDC for receipt by the common DC bus 930. In this manner, the benefits of a single flow battery (e.g., fewer electrolyte conduits, pumps, lower operating voltage and reduced effects of shunt currents) can be obtained by the flow battery system 1000 while still providing voltage output suitable for use with the common DC bus 930.

The site controller 1008 is configured to coordinate operation of one or more of the DC/DC converter 1006, the AC/DC inverter 904, the DC/DC converter 906, and the load charging DC/DC converter 910 to control the voltage of the common DC bus 930 within a predetermined operating range. In certain embodiments, the common DC bus 930 can be configured to operate within a voltage range from about 500 VDC to about 1500 VDC. As an example, the AC/DC inverter 904, the DC/DC converter 906, the load charging DC/DC converter 910, and the DC/DC converter 1006 can each be in signal communication with the site controller 1008 via respective communication links (e.g., 1010, 1012). In further embodiments, the site controller 1008 can be a component of the DC/DC converter 1006.

So configured, the flow battery system 1000 is capable of charging one or more loads 512 (e.g., an EV) while also being able to charge or discharge the battery stack(s) 602 at the same time from the AC power source 510*a*. Furthermore, the site controller 1008 can perform load leveling, also referred to as load balancing, based upon tariff structures. That is, the site controller 1008 can adjust the voltage of the common DC bus 930 by controlling the voltage of output of the DC/DC converter. As discussed above, the voltage of the common DC bus 930 can be decreased at times of high demand to discharge the flow battery 1002 and increased at times of low demand to charge the flow battery 1002. As a result, the flow battery 1002 can minimize the cost (e.g., consumption and demand charges) to charge the flow battery 1002 from the AC power source 510*a*.

Additionally, when deployed at scale, the flow battery system 1000 can supplement an electrical grid or other power transmission network. Currently, electrical grid components are sized based upon power delivery for peak demand, which is significantly greater than average demand. With power in excess of average demand being supplied by many flow battery systems 1000 tied to the electrical grid, electrical interconnects can be sized to average, not peak demand, providing a significant cost savings.

Figure 11:
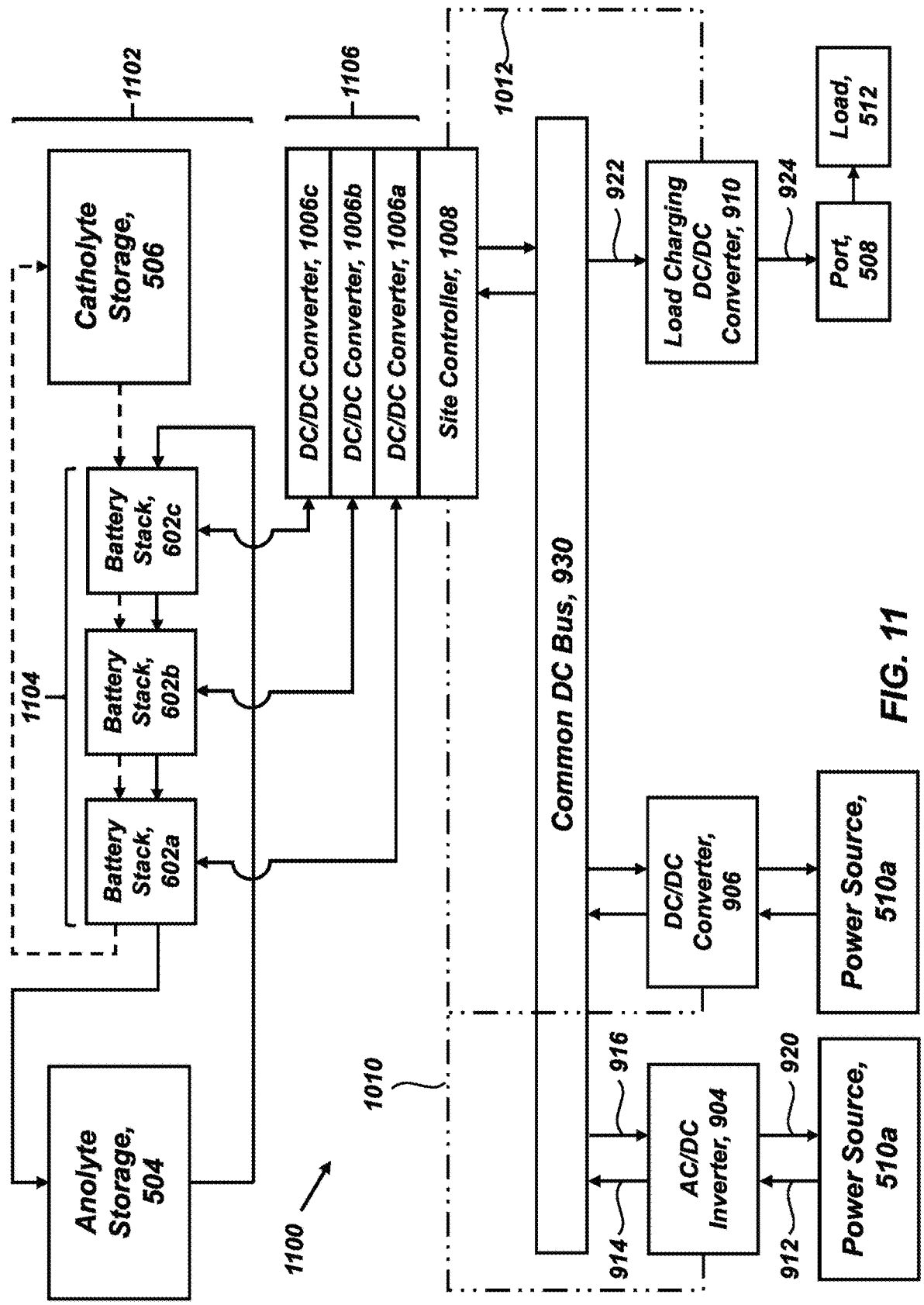
FIG. 11 is a block diagram illustrating an alternative embodiment of the modular flow battery system of FIG. 10 including a flow battery including a plurality of battery stacks arranged electrically in parallel and a plurality of DC/DC converters arranged electrically in series, each DC/DC converter configured to receive DC from a respective one of the plurality of battery stacks.

An alternative embodiment of the flow battery system 1000 is illustrated in the form of flow battery system 1100 including a flow battery 1102. As shown in FIG. 11, the flow battery 1102 includes a plurality of battery stacks 1104 in fluid communication with the anolyte storage vessel 504 and catholyte storage vessel 506 and the plurality of DC/DC converters 1006. Each of the plurality of battery stacks 1104 is further arranged electrically in parallel with one another and in electrical communication with a single, dedicated DC/DC converter. That is, each of the stacks is operated in isolation from the others. Each of the DC/DC converters 1106 is further galvanically isolated and arranged in series with respect to one another. As a result, stray currents, such as differences in ground potential or currents induced by AC power, are blocked.

As noted above, in some circumstances, multiple battery stacks in series can exhibit higher shunt current losses. Alternatively, the use of parallel battery stacks with a DC/DC converter can be subject to reduced conversion efficiency when the ratio of the DC voltage output to input increases. However, these issues can be mitigated in the flow battery 1100 in two ways. In one aspect, shunt currents are reduced by operating the plurality of battery stacks 1104 are arranged in parallel (e.g., in isolation and connected to a galvanically isolated DC/DC converter). This allows the plurality of battery stacks 1104 to operate at a lower voltage, thus reducing shunt current losses. In a further aspect, placing the plurality of galvanically isolated DC/DC converters in series provides a DC output at higher voltage with lower conversion ratio and therefore improved conversion efficiency.

In the exemplary embodiment of FIG. 11, the plurality of battery stacks 1104 includes three battery stacks 602*a*, 602*b*, 602*c*, each in electrical communication with a single DC/DC converter 1106*a*, 1106*b*, 1106*c*, respectively. Assuming typical operating values 1 VDC (discharge) and 1.6 VDC (end of charge) and that each of the plurality of battery stacks 1104 includes 125 flow battery cells in series, each stack voltage would range from 125 VDC to 200 VDC. Further assuming that each of the plurality of DC/DC converters 1106 operates with a conversion ratio of 2.4:1, the effective stack voltage is boosted to about 300 VDC. Three DC/DC converters (e.g., 1106*a*, 1106*b*, 1106*c*) in series would provide 900 VDC to the common DC bus 930 with reduced shunt current losses and DC/DC converter losses. Increasing the number of battery stacks and DC/DC converters can raise this voltage further.

Figure 12:
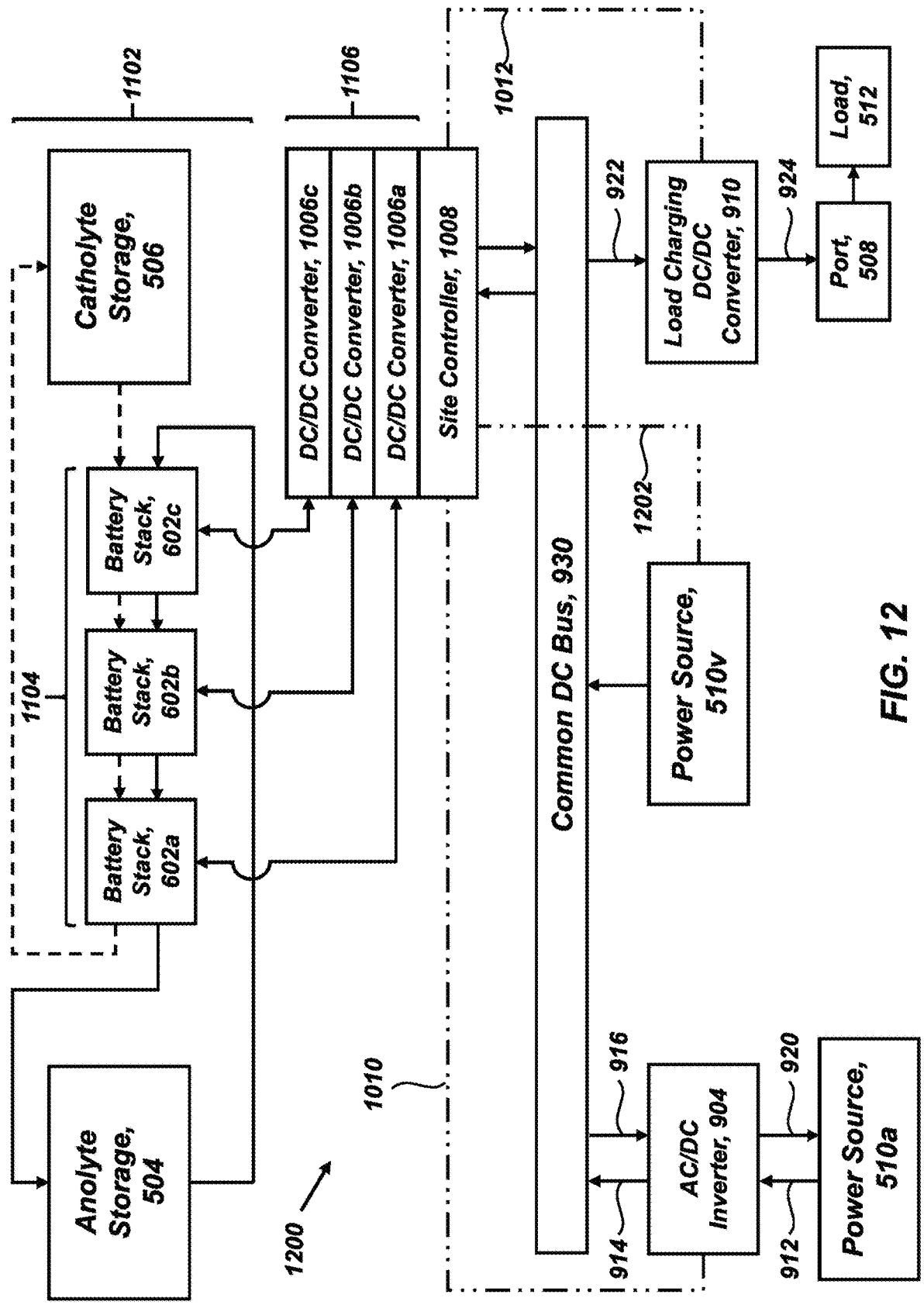
FIG. 12 is a block diagram illustrating an alternative embodiment of the modular flow battery system of FIG. 11 in which the common DC bus is configured to receive DC directly from a variable DC power source.

FIG. 12 illustrates an alternative embodiment of the flow battery system 1100 in the form of flow battery system 1200. As illustrated, the common DC bus 930 of the flow battery system 1200 is configured to receive electrical power directly from a variable DC power source 510*v*. That is, without an intermediate DC/DC converter. The variable DC power source 510*v* supplies DC to the common DC bus 930 at a variable voltage (e.g., a renewable power source solar array, wind turbine). Therefore, the voltage of the common DC bus 930 is dictated by the voltage output of the variable DC power source 510*v*.

In order to maximize power extraction efficiency from the variable DC power source 510*v* under all conditions, the site controller 1008 can be further configured to control the voltage output of the plurality of DC/DC converters 1106 based upon maximum power point tracking (MPPT) techniques. In general, renewable energy sources provide variable power output depending upon environmental conditions (e.g., amount of sunlight incident upon panels of the solar array). The efficiency of power transfer from the variable DC power source 510v to the common DC bus 930 can be optimized by matching the impedance of the common DC bus 930 to match that of the variable DC power source 510v. Thus, the power transfer efficiency from the variable DC power source 510v to the flow battery system 1200 can be optimized by changing the voltage of the common DC bus 930 to match its impedance with that of the variable DC power source 510v.

In order to control the voltage output of the plurality of DC/DC converters 1106 based upon maximum power point tracking (MPPT) techniques, the site controller 1008 can be further configured for communication with the DC power source 510d via a communication link 1202 and the load charging DC/DC converter 910 via communication link 1012. By receiving information regarding the DC power output of the DC power source 510d via communication link 1202, the site controller 1008 can provide commands to the load charging DC/DC converter 910 via communication link 1202 to adjust the voltage output of the plurality of DC/DC converters 1106. As an example, the site controller 1008 can command the plurality of DC/DC converters 1106 to adjust the voltage of the common DC bus 930 using the MPPT technique and maximize power transfer from the renewable energy source.

In certain embodiments, DC/DC converters 1006 can be paralleled on the common DC bus 930. As discussed in greater detail below, the paralleled DC/DC converters 1006 can be parallel connected to the same flow battery (FIG. 13), parallel connected to independent flow batteries (FIG. 14), and combinations thereof. That is, a plurality of flow batteries can be electrically connected to the common DC bus 930 via respective DC/DC converters 1006.

Figure 13:
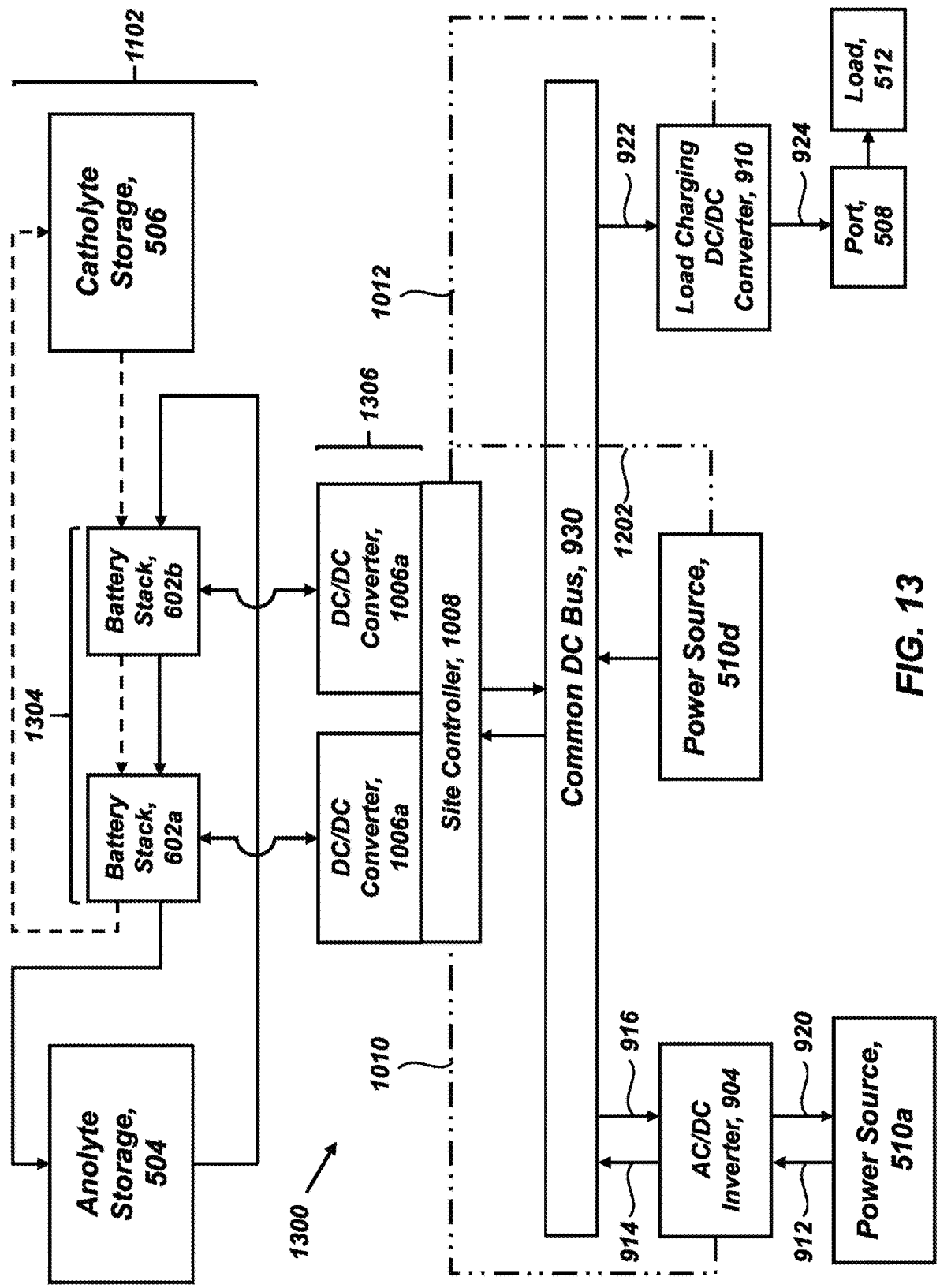
FIG. 13 is a block diagram illustrating an alternative embodiment of the modular flow battery system of FIG. 10 including a flow battery including a plurality of battery stacks arranged electrically in parallel and a plurality of DC/DC converters arranged electrically in parallel, each DC/DC converter configured to receive DC from a respective one of the plurality of battery stacks.

FIG. 13 illustrates an alternative embodiment of the flow battery system 1100 in the form of flow battery system 1300. The series arrangement of the plurality of the DC/DC converters 1106 is replaced by a parallel arrangement of a plurality of DC/DC converters 1306. Each of the plurality of DC/DC converters 1106 is in electrical communication with a single one of a plurality of battery stacks 1304. As shown, a DC/DC converter 1306a is coupled to the battery stack 602a and a DC/DC converter 1306b is coupled to the battery stack 602b. In this manner, parallel DC/DC converter strings including one of the plurality of battery stacks and one of the plurality of DC/DC converters can be provided.

The parallel arrangement of the DC/DC converter strings in the flow battery system 1300 provides a number of benefits. In one aspect, power output is scalable. The flow battery system 1300 can increase power output by increasing the number of battery stacks and DC/DC converters. While existing flow battery systems can also increase power output by adding battery stacks, these flow battery systems also require initial power electronics to be sized for maximum power output. This requirement of the initial power electronics results in a large up-front capital investment and less than optimum operating point for oversized electronics. In another aspect, respective ones of the plurality of battery stacks 1304 can be turned on or off based upon expected load to maximize operating efficiency. In a further aspect, failure of a single one of the plurality of battery stacks 1304 or the plurality of DC converters 1306 can be isolated to the DC/DC converter strings including the failed battery stack and/or DC/DC converter. Remaining DC/DC converter strings can continue operation.

Figure 14:
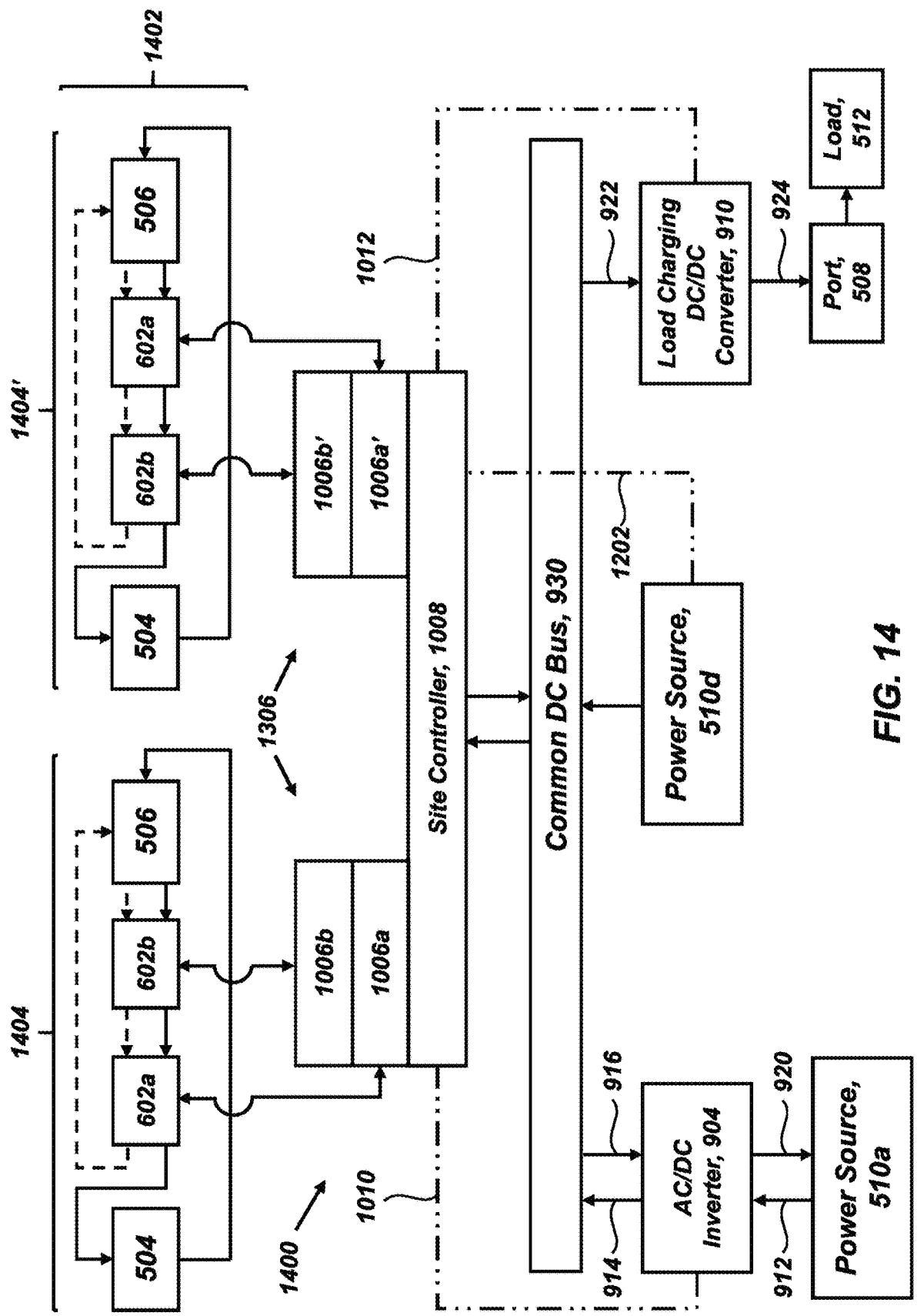
FIG. 14 is a block diagram illustrating an alternative embodiment of the modular flow battery system of FIG. 13 including a plurality of flow batteries, each including a plurality of battery stacks arranged electrically in parallel. A first and second plurality of DC/DC converters are arranged electrically in parallel. DC converters of the first plurality of DC converters are configured to receive DC from respective ones of the first plurality of battery stacks and DC converters of the second plurality of DC converters are configured to receive DC from respective ones of the second plurality of battery stacks.

FIG. 14 illustrates an alternative embodiment of the flow battery system 1300 in the form of flow battery system 1400. The flow battery system 1400 generally retains the parallel DC/DC converter strings of flow battery system 1300 but includes a plurality of flow batteries 1402. Each of the plurality of flow batteries 1402 can include one or more battery stacks 602, and each battery stack 602 is in direct electrical communication with a single DC/DC converter 1006 of the plurality of DC/DC converters 1306. Further, the DC/DC converters 1006 associated with a given flow battery are in series. Thus, each DC/DC converter string is associated with a different one of the plurality of flow batteries 1402 and parallel to the DC/DC converter strings of the other flow batteries of the flow battery system 1400.

As shown in FIG. 14, each of the plurality of flow batteries 1402 includes flow batteries 1404, 1404'. Each of the flow batteries 1404, 1404' includes a pair of battery stacks 602a, 602b. The battery stacks 602a, 602b of flow battery 1404 are in communication with the DC/DC converters 1006a, 1006b, respectively. The battery stacks 602a', 602b' of flow battery 1404 are in communication with the DC/DC converters 1006a', 1006b', respectively. In alternative embodiments, the flow battery system of FIG. 14 can include more than two flow batteries and the number of battery stacks and corresponding DC/DC converters of each flow battery can be varied as necessary to achieve a desired maximum power output.

The addition of parallel DC/DC converter strings, in combination with the plurality of flow batteries 1402, provides flexibility in the design of the flow battery system 1400. In one aspect, the physical size of components employed for electrolyte storage and transport within each flow battery can be varied and tailored to specific installations. As an example, the volume of anolyte and catholyte required to support a desired amount of charge storage can be distributed between multiple electrolyte storage vessels. The size of each electrolyte storage vessel, fluid conduits, and corresponding pumps employed with the plurality of flow batteries 1402 can be reduced as compared to that of a single flow battery of the same charge capacity. In another example, the size of each of the plurality of flow batteries 1402 can be based upon other non-electrical considerations, such as physical site restrictions, regulatory requirements, and local supply chains and component availability.

An additional benefit provided by the flow battery system 1400 is the ability to electrochemically balance the plurality of flow batteries 1402. In general, the amount of charge that can be stored and delivered by a flow battery is based upon electrolyte volume, electrolyte concentration, state of charge (SOC), and health of the electrolyte. Therefore, when employing multiple flow batteries, the charge that can be stored and delivered is limited by the least-capable flow battery. Thus, electrochemical balance of the electrolyte is desirable to reduce differences between the multiple flow batteries.

Existing flow battery systems achieve electrochemical balance by careful installation and routine mixing of each of the anolyte and catholyte to ensure that they remain substantially homogeneous. However, such electrochemical balancing comes at a cost of efficiency, downtime, and labor. In contrast, embodiments of the flow battery system 1400 each DC converter string is isolated. Thus, the output of each DC converter string can be controlled by the site controller 1008 account for differences in capacity and/or state of charge.

In this manner, significant scalability can be achieved. As an example, more battery stacks can be added to the flow battery systems 800, 900, 1000, 1100, 1200, 1300, 1400 if more power output is needed for charging EVs. Alternatively or additionally, more electrolyte storage vessels can be added to the flow battery systems 800, 900, 1000, 1100,

1200, 1300, 1400 if more energy storage capacity is needed. Beneficially, each of these changes can be effected with relatively minor infrastructure changes due to the portable nature of each of the battery stacks and the electrolyte storage tanks.

In each of the embodiments discussed above, inputs and outputs to the disclosed charging systems can be adjusted. In one aspect, a number of vehicle charging ports, anolyte and catholyte storage vessels, and battery stacks can be increased or decreased as necessary. In this manner, a number of electric vehicles, a total charge and discharge power, and an electrical power storage capacity can be adjusted as necessary for a given deployment.

Figure 15:
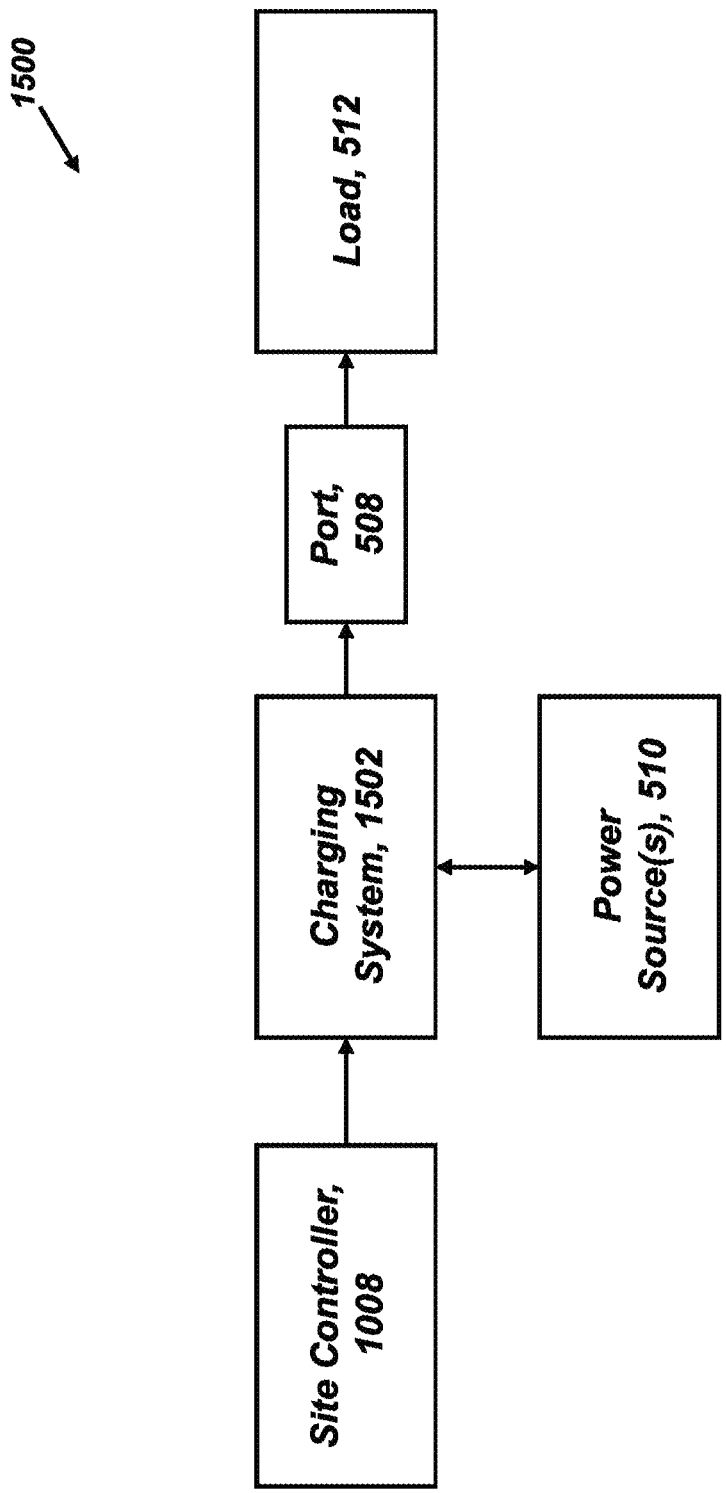
FIG. 15 is a block diagram illustrating one exemplary embodiment of an operating environment including a charging system in communication with a controller configured to direct electrical power between the charging system, one or more power sources, and one or more electrical loads.

FIG. 15 illustrates an embodiment of an operating environment 1500 including a charging system 1502 suitable for charging electric vehicles. The charging system 1502 can include any of the flow batteries and flow battery systems 500, 600, 620, 700, 800, 900, 1000, 1100, 1200, 1300, 1400 discussed above and configured for electrical communication with a power source 510 and a load 512. The power source 1504 can be one or more sources of providing electrical energy to the charging system 1502 (e.g., an electrical grid, renewable energy sources, electrical power generation facilities, etc.) and the load 512 can be one or more devices (e.g., electric vehicles) capable of receiving electrical energy from the charging system 1502.

The charging system 1502 can also include the site controller 1008. The site controller 1008 can be configured to control power flows input to and/or output from the charging system 1502, the one or more power sources 510, and the load 512.

In one embodiment, the site controller 1008 can cause power to flow from the one or more power sources 510 to the load 512, bypassing the charging system 1502.

In another embodiment, the site controller 1008 can cause power to flow from the one or more power sources 510 to the charging system 1502, bypassing the load 512.

In another embodiment, the site controller 1008 can cause power to flow from the one or more power sources 510 to both of the charging system 1502 and the load 512.

In another embodiment, the site controller 1008 can cause power to flow from the charging system 1502 only to the load 512.

In another embodiment, the site controller 1008 can cause power to flow from the charging system 1502 only to the one or more power sources 510.

In another embodiment, the site controller 1008 can cause power to flow from the charging system 1502 simultaneously to the one or more power sources 510 and the load 512.

In another embodiment, the site controller 1008 can cause power to flow to a selected load of a plurality of loads 512 in electrical communication with the charging system 1502.

The site controller 1008 can further be employed to control operation of the charging system 1502 as a function of time and demand characteristics of one or more of the power source 510 and the load.

In one embodiment, circumstance, the site controller 1008 can cause the charging system 1502 to receive power from the power sources 510 during off-peak grid demand times and provide power to the power sources 510 during peak grid demand times.

In another embodiment, the site controller 1008 can cause the load 512 to receive power from the power sources 510 alone when power produced by the power source 510 is equal to or greater than a predetermined amount.

The site controller 1008 can cause the load 512 to receive power from both the power source 510 and the charging system 1502 when power produced by the power source 510 is less than a predetermined amount. Beneficially, the charging system 1502 can supplement power supplied to the load when the supplied power drops below the predetermined amount. In certain embodiments, power drops can occur when the power source is an electrical grid or a renewable energy source due to high demand (e.g., peak EV charging during morning and evening commute). In other embodiments, power drops can occur when employing renewable energy sources due to inherent intermittency of power generation. Examples can include wind strength of wind turbines, day and seasonal variations in cloud cover and daytime/nighttime hours for solar energy collection, etc. In further embodiments, power drops can occur in electrical grids due to planned and/or unplanned brownout or blackout conditions.

In additional embodiments, the site controller 1008 can be configured to control electrical energy storage and/or electrical energy discharge by the charging system in order to provide utility support. Such support can include one or more of voltage regulation and VAR correction.

In further embodiments, not shown, the charging system can be deployed at a vehicle charging station and provided in electrical communication with at least a portion of electrical infrastructure of the station (e.g., lights, heaters, etc.). Thus, in additional to vehicle charging, embodiments of the charging system can be configured to provide at least a portion of electrical power to the station infrastructure during peak power demand to avoid demand charges and tariffs assessed by an electrical power supplier.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

It must be noted that, as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. Nothing herein is to be construed as an admission that the invention is not entitled to antedate such disclosure by virtue of prior invention.

Whenever a range is given in the specification, for example, a temperature range, a time range, or a composition or concentration range, all intermediate ranges and sub-ranges, as well as all individual values included in the ranges given are intended to be included in the disclosure. As used herein, ranges specifically include the values provided as endpoint values of the range. For example, a range of 1 to 100 specifically includes the end point values of 1 and 100. It will be understood that any sub-ranges or individual values in a range or sub-range that are included in the description herein can be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

A person skilled in the art will appreciate further features and advantages of the disclosure based on the above-described embodiments. Accordingly, the disclosed embodiments are not to be limited by what has been particularly shown and described, except as indicated by the appended claims. All publications and references cited herein are expressly incorporated by reference in their entirety.

The invention claimed is:

1. A charging system, comprising:
   at least one flow battery configured to output a first DC at a first voltage;
   a first DC/DC converter configured to receive the first DC and to output a second DC at a second voltage;
   an AC/DC inverter configured to receive AC from an AC power source and to output a third DC at a third voltage;
   a second DC/DC converter configured to receive a fourth DC at a fourth voltage and output a fifth DC at a fifth voltage;
   a single common DC bus configured to receive the second DC and the third DC and output the fourth DC;
   a site controller in signal communication with the first DC/DC converter, the AC/DC inverter, and the second DC/DC converter, wherein the site controller is configured to transmit commands to at least one of the first DC/DC converter and the AC/DC inverter to adjust the second voltage and the third voltage; and
   one or more charging ports configured to receive the fifth voltage and transmit the fifth voltage to an electric vehicle (EV).

2. The charging system of claim 1, wherein the AC power source is an electrical grid.

3. The charging system of claim 1, wherein the site controller is configured to adjust the second voltage and the third voltage to achieve a voltage on the common DC bus within a predetermined range.

4. The charging system of claim 3, wherein the site controller is configured to command the first DC/DC converter to receive a sixth DC at a sixth voltage from the common DC bus and to output a seventh DC at a seventh voltage to the at least one flow battery for charging the at least one flow battery.

5. The charging system of claim 4, wherein the site controller is configured to command the DC/DC converter to output the second DC to the common DC bus and to command the AC/DC inverter to output the third DC to the common DC bus to achieve a predetermined bus voltage on the common DC bus relative to an open circuit voltage of the at least one flow battery to selectively charge or discharge the at least one flow battery.

6. The charging system of claim 1, further comprising:
   the at least one flow battery including a plurality of battery stacks arranged electrically in parallel, each of the plurality of battery stacks configured to output the first DC; and
   a plurality of first DC/DC converters arranged electrically in series, wherein each DC/DC converter is configured to receive the first DC from a respective one of the plurality of battery stacks.

7. The charging system of claim 6, wherein the common DC bus is configured to receive an eighth DC directly from a variable DC power source having a variable voltage output.

8. The charging system of claim 7, wherein the variable DC power source is not connected to the common DC bus via a DC/DC converter.

9. The charging system of claim 8, wherein the site controller is configured to adjust the second voltage and the third voltage to regulate the voltage on the common DC bus within a predetermined range such that an impedance of the common DC bus matches an impedance of the variable DC power source.

10. The charging system of claim 1, further comprising:
    the at least one flow battery including a plurality of battery stacks arranged electrically in parallel, each of the plurality of battery stacks configured to output the first DC;
    a plurality of DC/DC converters galvanically isolated from one another and arranged electrically in series with one another;
    wherein each DC/DC converter is configured to receive the first DC from a respective one of the plurality of battery stacks.

11. The charging system of claim 1, further comprising:
    the at least one flow battery including a first flow battery and a second flow battery, wherein each of the first and second flow batteries includes at least one battery stack configured to output the first DC;
    a first DC/DC converter configured to receive the first DC from a battery stack of the first flow battery; and
    a second DC/DC converter configured to receive the first DC from a battery stack of the second flow battery;
    wherein the first and second DC/DC converters are galvanically isolated from one another and arranged electrically in parallel with one another.

12. The charging system of claim 11, wherein the first flow battery includes a first plurality of battery stacks arranged electrically in parallel with one another and the second flow battery includes a second plurality of battery stacks arranged electrically in parallel with one another.

13. The charging system of claim 12, further comprising a first plurality of DC/DC converters including the first DC/DC converter and a second plurality of DC/DC converters including the second DC/DC converter, wherein each DC/DC converter of the first plurality of DC/DC converters is arranged electrically in series and is configured to receive the first DC from a respective battery stack of the first plurality of battery stacks, and wherein each DC/DC converter of the second plurality of DC/DC converters is arranged electrically in series and is configured to receive the first DC from a respective battery stack of the second plurality of battery stacks.

* * * * *